US008698727B2

(12) United States Patent
Herz et al.

(10) Patent No.: US 8,698,727 B2
(45) Date of Patent: Apr. 15, 2014

(54) BACKLIGHT AND AMBIENT LIGHT SENSOR SYSTEM

(75) Inventors: Scott M. Herz, Santa Clara, CA (US); Roberto G. Yepez, San Francisco, CA (US); Scott Forstall, Mountain View, CA (US); Patrick L. Coffman, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 1102 days.

(21) Appl. No.: 11/770,614

(22) Filed: Jun. 28, 2007

(65) Prior Publication Data

US 2008/0165116 A1 Jul. 10, 2008

Related U.S. Application Data

(63) Continuation-in-part of application No. 11/650,014, filed on Jan. 5, 2007, now Pat. No. 8,031,164.

(51) Int. Cl.
*G09G 3/36* (2006.01)

(52) U.S. Cl.
USPC ......... 345/102; 345/207; 345/173; 455/556.2

(58) Field of Classification Search
USPC ................. 345/102, 207, 173; 455/556.2
See application file for complete search history.

(56) References Cited

U.S. PATENT DOCUMENTS

| 5,095,945 A | 3/1992 | Jensen et al. |
| 5,103,085 A | 4/1992 | Zimmerman |
| 5,270,818 A | 12/1993 | Ottenstein |
| 5,406,305 A | 4/1995 | Shimomura et al. |
| 5,528,266 A | 6/1996 | Arbeitman et al. |
| 5,684,294 A | 11/1997 | Kouhi |

(Continued)

FOREIGN PATENT DOCUMENTS

| CN | 1581052 | 2/2005 |
| EA | 1465462 | 10/2004 |

(Continued)

OTHER PUBLICATIONS

Agilent Technologies Inc., "Agilent unveils optical proximity sensor for mobile appliances", http:/www.embeddedstar.com/press/content/2004/8/embedded16015.html, (Aug. 31, 2004),2 pages.

(Continued)

*Primary Examiner* — William Boddie
*Assistant Examiner* — Saifeldin Elnafia
(74) *Attorney, Agent, or Firm* — Blakely, Sokoloff, Taylor & Zafman LLP

(57) ABSTRACT

Apparatuses and methods to operate a display device of an electronic device. In some embodiments, a method includes receiving a user setting or input of a display control parameter, and causing or altering, based on the user setting or input, an effect of an ambient light sensor value (ALS) on control of the display control parameter. The user input may be an unlock of a touch screen input capability of the display device, and a wake of the display device from an inactivity dim. Also, according to embodiments of the inventions, a method of operating a display of an electronic device includes receiving a change to one of a display brightness output level and an ambient light sensor output level, and altering, according to the change, a display brightness or contrast output level. Other apparatuses and methods and data processing systems and machine readable media are also described.

18 Claims, 15 Drawing Sheets

(56) References Cited

U.S. PATENT DOCUMENTS

| | | |
|---|---|---|
| 5,786,801 A | 7/1998 | Ichise |
| 5,884,156 A | 3/1999 | Gordon |
| 5,894,298 A | 4/1999 | Hoeksma |
| 5,952,992 A | 9/1999 | Helms |
| 6,018,674 A | 1/2000 | Aronow |
| 6,208,854 B1 | 3/2001 | Roberts et al. |
| 6,246,862 B1 | 6/2001 | Grivas et al. |
| 6,289,453 B1 | 9/2001 | Walker et al. |
| 6,373,612 B1 | 4/2002 | Hoffman et al. |
| 6,477,374 B1 | 11/2002 | Shaffer et al. |
| 6,520,013 B1 | 2/2003 | Wehrenberg |
| 6,522,697 B1 | 2/2003 | Spickermann |
| 6,583,676 B2 | 6/2003 | Krah et al. |
| 6,601,012 B1 | 7/2003 | Horvitz et al. |
| 6,664,744 B2 | 12/2003 | Dietz |
| 6,724,994 B1 | 4/2004 | Collings et al. |
| 6,803,920 B2 | 10/2004 | Gossett et al. |
| 6,812,466 B2 | 11/2004 | O'Connor et al. |
| 6,822,635 B2 | 11/2004 | Shahoian et al. |
| 6,947,017 B1 | 9/2005 | Gettemy |
| 6,947,571 B1 | 9/2005 | Rhoads et al. |
| 6,956,564 B1 | 10/2005 | Williams |
| 7,016,705 B2 | 3/2006 | Bahl et al. |
| 7,019,622 B2 | 3/2006 | Orr et al. |
| 7,117,021 B2 | 10/2006 | Shearer et al. |
| 7,117,380 B2 | 10/2006 | Kangas |
| 7,171,221 B1 | 1/2007 | Amin et al. |
| 7,177,664 B2 | 2/2007 | Weinzweig et al. |
| 7,209,719 B2 | 4/2007 | Liebenow |
| 7,268,775 B1 | 9/2007 | Gettemy |
| 7,522,065 B2 | 4/2009 | Falcon |
| 7,605,693 B2 | 10/2009 | Kulas |
| 7,633,076 B2 | 12/2009 | Huppi et al. |
| 2001/0031633 A1 | 10/2001 | Tuomela et al. |
| 2001/0031645 A1 | 10/2001 | Jarrett |
| 2002/0018050 A1 | 2/2002 | Turner |
| 2002/0019249 A1 | 2/2002 | Kashu et al. |
| 2002/0065099 A1 | 5/2002 | Bjorndahl |
| 2002/0167488 A1 | 11/2002 | Hinckley et al. |
| 2003/0022666 A1 | 1/2003 | Sato |
| 2003/0022671 A1 | 1/2003 | Huomo et al. |
| 2003/0095096 A1 | 5/2003 | Robbin et al. |
| 2003/0108300 A1 | 6/2003 | Walker et al. |
| 2003/0224726 A1 | 12/2003 | Shearer et al. |
| 2004/0012556 A1 | 1/2004 | Yong et al. |
| 2004/0063452 A1 | 4/2004 | Tomoda |
| 2004/0110472 A1 | 6/2004 | Witkowski et al. |
| 2004/0180649 A1 | 9/2004 | Vogel et al. |
| 2004/0203351 A1 | 10/2004 | Shearer et al. |
| 2004/0213576 A1 | 10/2004 | Tan et al. |
| 2004/0224638 A1 | 11/2004 | Fadell et al. |
| 2004/0233153 A1 | 11/2004 | Robinson |
| 2004/0245438 A1 | 12/2004 | Payne et al. |
| 2005/0057169 A1 | 3/2005 | Noguchi et al. |
| 2005/0104908 A1 | 5/2005 | Brown Elliott |
| 2005/0132416 A1 | 6/2005 | Wasilewski |
| 2005/0143057 A1 | 6/2005 | Shiraga et al. |
| 2005/0168658 A1 | 8/2005 | Woolgar et al. |
| 2005/0171662 A1 | 8/2005 | Strege et al. |
| 2005/0190142 A1 | 9/2005 | Ferguson |
| 2005/0219223 A1 | 10/2005 | Kotzin et al. |
| 2005/0219228 A1 | 10/2005 | Alameh et al. |
| 2005/0219394 A1 | 10/2005 | Du et al. |
| 2005/0221791 A1 | 10/2005 | Angelhag |
| 2005/0253817 A1* | 11/2005 | Rytivaara et al. ............ 345/173 |
| 2006/0007107 A1 | 1/2006 | Ferguson |
| 2006/0017692 A1 | 1/2006 | Wehrenberg et al. |
| 2006/0026521 A1 | 2/2006 | Hotelling et al. |
| 2006/0026535 A1 | 2/2006 | Hotelling et al. |
| 2006/0052141 A1 | 3/2006 | Suzuki |
| 2006/0060762 A1 | 3/2006 | Chan et al. |
| 2006/0081771 A1* | 4/2006 | Eliad Wardimon ........... 250/221 |
| 2006/0082057 A1 | 4/2006 | Luciano et al. |
| 2006/0087245 A1* | 4/2006 | Ng et al. ....................... 315/149 |
| 2006/0097991 A1 | 5/2006 | Hotelling et al. |
| 2006/0116175 A1 | 6/2006 | Chu |
| 2006/0117108 A1 | 6/2006 | Salisbury et al. |
| 2006/0146012 A1 | 7/2006 | Arneson et al. |
| 2006/0161870 A1 | 7/2006 | Hotelling et al. |
| 2006/0161871 A1 | 7/2006 | Hotelling et al. |
| 2006/0164241 A1 | 7/2006 | Makela et al. |
| 2006/0166702 A1 | 7/2006 | Dietz et al. |
| 2006/0197753 A1 | 9/2006 | Hotelling |
| 2006/0199536 A1 | 9/2006 | Eisenbach |
| 2006/0229101 A1 | 10/2006 | LaBauve et al. |
| 2006/0252470 A1 | 11/2006 | Seshadri et al. |
| 2006/0256067 A1* | 11/2006 | Montero et al. .............. 345/102 |
| 2006/0290921 A1 | 12/2006 | Hotelling |
| 2006/0291863 A1 | 12/2006 | Chan et al. |
| 2007/0003289 A1 | 1/2007 | Tan et al. |
| 2007/0004473 A1 | 1/2007 | Clark et al. |
| 2007/0042714 A1 | 2/2007 | Ayed |
| 2007/0046629 A1 | 3/2007 | Chi-Boon et al. |
| 2007/0057773 A1 | 3/2007 | Hsieh et al. |
| 2007/0065134 A1 | 3/2007 | Sugimoto |
| 2007/0075965 A1 | 4/2007 | Huppi et al. |
| 2007/0085157 A1 | 4/2007 | Fadell et al. |
| 2007/0088812 A1 | 4/2007 | Clark |
| 2007/0099574 A1 | 5/2007 | Wang |
| 2007/0123171 A1 | 5/2007 | Slamka et al. |
| 2007/0123287 A1 | 5/2007 | Mock et al. |
| 2007/0135091 A1 | 6/2007 | Wassingbo |
| 2007/0135151 A1 | 6/2007 | Dendy |
| 2007/0138493 A1 | 6/2007 | Morimoto et al. |
| 2007/0161410 A1* | 7/2007 | Huang et al. .................. 455/565 |
| 2007/0225047 A1 | 9/2007 | Bakos |
| 2007/0233759 A1 | 10/2007 | Tomlinson et al. |
| 2007/0239903 A1 | 10/2007 | Bhardwaj et al. |
| 2007/0266185 A1 | 11/2007 | Goddi et al. |
| 2007/0293188 A1 | 12/2007 | Houghton et al. |
| 2008/0006762 A1 | 1/2008 | Fadell et al. |
| 2008/0031206 A1 | 2/2008 | Sharma |
| 2008/0090537 A1 | 4/2008 | Sutardja |
| 2008/0090617 A1 | 4/2008 | Sutardja |
| 2008/0102882 A1* | 5/2008 | Sutardja ..................... 455/550.1 |
| 2008/0113618 A1 | 5/2008 | De Leon et al. |
| 2008/0192129 A1 | 8/2008 | Walker et al. |
| 2009/0047904 A1 | 2/2009 | Preston et al. |
| 2009/0098865 A1 | 4/2009 | Vaghi et al. |
| 2009/0244092 A1 | 10/2009 | Hotelling |
| 2009/0313473 A1 | 12/2009 | Walker et al. |
| 2010/0105391 A1 | 4/2010 | Bennett et al. |

FOREIGN PATENT DOCUMENTS

| | | |
|---|---|---|
| EM | 1696414 | 8/2006 |
| EP | 0992969 | 4/2000 |
| EP | 1185058 | 3/2002 |
| EP | 1335430 | 8/2003 |
| EP | 1355223 | 10/2003 |
| EP | 1 445 922 A1 | 8/2004 |
| EP | 1452988 | 9/2004 |
| EP | 1507132 | 2/2005 |
| EP | 1507196 | 2/2005 |
| EP | 1650938 | 4/2006 |
| EP | 1667103 | 6/2006 |
| EP | 1696414 | 8/2006 |
| GB | 2346500 | 8/2000 |
| GB | 2418808 | 4/2006 |
| JP | 05-323277 | 12/1993 |
| JP | 9146073 | 6/1997 |
| JP | 2001244498 | 9/2001 |
| JP | 2001-352395 | 12/2001 |
| JP | 2003-204390 | 7/2003 |
| JP | 2004-021476 | 1/2004 |
| JP | 2004159028 | 6/2004 |
| JP | 2004357193 | 12/2004 |
| JP | 2005-260996 | 9/2005 |
| JP | 2005-278043 | 10/2005 |
| JP | 2007-163872 | 6/2007 |
| WO | WO 00/79766 A1 | 12/2000 |
| WO | WO-2004055769 | 7/2004 |
| WO | WO-2004/093045 | 10/2004 |

(56) References Cited

FOREIGN PATENT DOCUMENTS

| WO | WO-2005/071759 | 4/2005 |
|---|---|---|
| WO | WO-2005/101176 | 10/2005 |
| WO | WO 2005/114369 A2 | 12/2005 |

OTHER PUBLICATIONS

Apple Inc., "PCT Notification of Transmittal of the International Search Report and the Written Opinion of the International Searching Authority", PCT/US2007/022335, (Feb. 18, 2008).
CNET News.Com, "Reinventing the Scroll Wheel", Photo 1, http://news.com/2300-1041_3-6107951-1.html?tag=ne.gall.pg, (Aug. 22, 2006),2 pages.
CNET News.Com, "Reinventing the Scroll Wheel", Photo 2, http://news.com/2300-1041_3-6107951-2.html?tag=ne.gall.pg, (Aug. 22, 2006),2 pages.
CNET News.Com, "Reinventing the Scroll Wheel", Photo 3, http://news.com/2300-1041_3-6107951-3.html?tag=ne.gall.pg, (Aug. 22, 2006),2 pages.
CNET News.Com, "Reinventing the Scroll Wheel", Photo 4, http://news.com/2300-1041_3-6107951-4.html?tag=ne.gall.pg, (Aug. 22, 2006),2 pages.
CNET News.Com, "Reinventing the Scroll Wheel", Photo 5, http://news.com/2300-1041_3-6107951-5.html?tag=ne.gall.pg, (Aug. 22, 2006),2 pages.
CNET News.Com, "Reinventing the Scroll Wheel", Photo 6, http://news.com/2300-1041_3-6107951-6.html?tag=ne.gall.pg, (Aug. 22, 2006),2 pages.
CNET News.Com, "Reinventing the Scroll Wheel", Photo 7, http://news.com/2300-1041_3-6107951-7.html?tag=ne.gall.pg, (Aug. 22, 2006),2 pages.
CNET News.Com, "Reinventing the Scroll Wheel", Photo 8, http://news.com/2300-1041_3-6107951-8.html?tag=ne.gall.pg, (Aug. 22, 2006),2 pages.
Kennedy, "Methods and Apparatuses for Configuration Automation", U.S. Appl. No. 10/805,144, 59 pages.
Roos, Gina "Agilent's new proximity sensor beats the fumble-fingered competition hands down . . . literally", eeProductCenter, URL:http://www.eeproductcenter.com/showArticle.jhtml?articleID_46200544, (Sep. 1, 2004),3 pages.
Universal Remote Control, Inc., "MX-950 (The Aurora)", www.unversalremote.com, (2005).
Universal Remote Control, Inc., "All Complete Control Remotes Now Use Narrow Band RF", http://www.universalremote.com/corporate/press_release.php?press=13, (2008).
Universal Remote Control, Inc., "Operating System with the Aurora MX-950", MX-950 Owners Manual, (2005).
Non Final Office Action mailed Mar. 22, 2010; U.S. Appl. No. 11/638,251.
Apple Inc., Non Final Office Action mailed Mar. 8, 2010; U.S. Appl. No. 11/620,702.
Apple Inc., Final Office Action mailed Nov. 19, 2009; U.S. Appl. No. 11/620,702.
Apple Inc., PCT Search Report and Written Opinion mailed Jun. 3, 2008, PCT Appln. No. PCT/US2007/026164.
"Apple Inc.", International Preliminary Report on Patentability mailed May 28, 2009; PCT Applicaiotn No. PCT/US2007/023124.
"Apple Inc.", International Preliminary Report on Patentability mailed May 7, 2009; PCT Application No. PCT/US2007/022335.
"Apple Inc.", International Preliminary Report on Patentability mailed Jul. 16, 2009; PCT Application No. PCT/US2007/026164.
"Apple Inc.", International Preliminary Report on Patentability mailed Jul. 16, 2009; PCT Application No. PCT/US2007/026141.
"Proximity Sensor Demo Kit User Guide, Version 0.62-Preliminary", *Integration Associates, Inc.*; 2004, 17 pages.
Apple Inc., International Preliminary Report on Patentability mailed Jul. 16, 2009; PCT Application No. PCT/US2007/026130.
Apple Inc., "PCT Search Report and Written Opinion mailed Jul. 3, 2008", PCT/US2007/023124, 14 pages.
Apple Inc., Non Final Office Action dated May 18, 2010; U.S. Appl. No. 11/871,725.
Apple Inc., Non Final Office Action dated May 24, 2010; U.S. Appl. No. 11/650,014.
PCT Search Report mailed Aug. 21, 2008; PCT/US2007/026130.
Apple Inc., Non Final Office Action dated Oct. 27, 2010 for U.S. Appl. No. 11/871,725.
Apple Inc., Final Rejectionl mailed Nov. 15, 2010; U.S. Appl. No. 11/650,014.
Apple Inc., Non Final Office Action dated Sep. 29, 2009; U.S. Appl. No. 11/638,251.
Supplemental European Search Report mailed Apr. 21, 2011 for EP Appln No. 07863192.6.
Intel Corp., Non final Office Action mailed Mar. 4, 2011; U.S. Appl. No. 11/650,014.

* cited by examiner

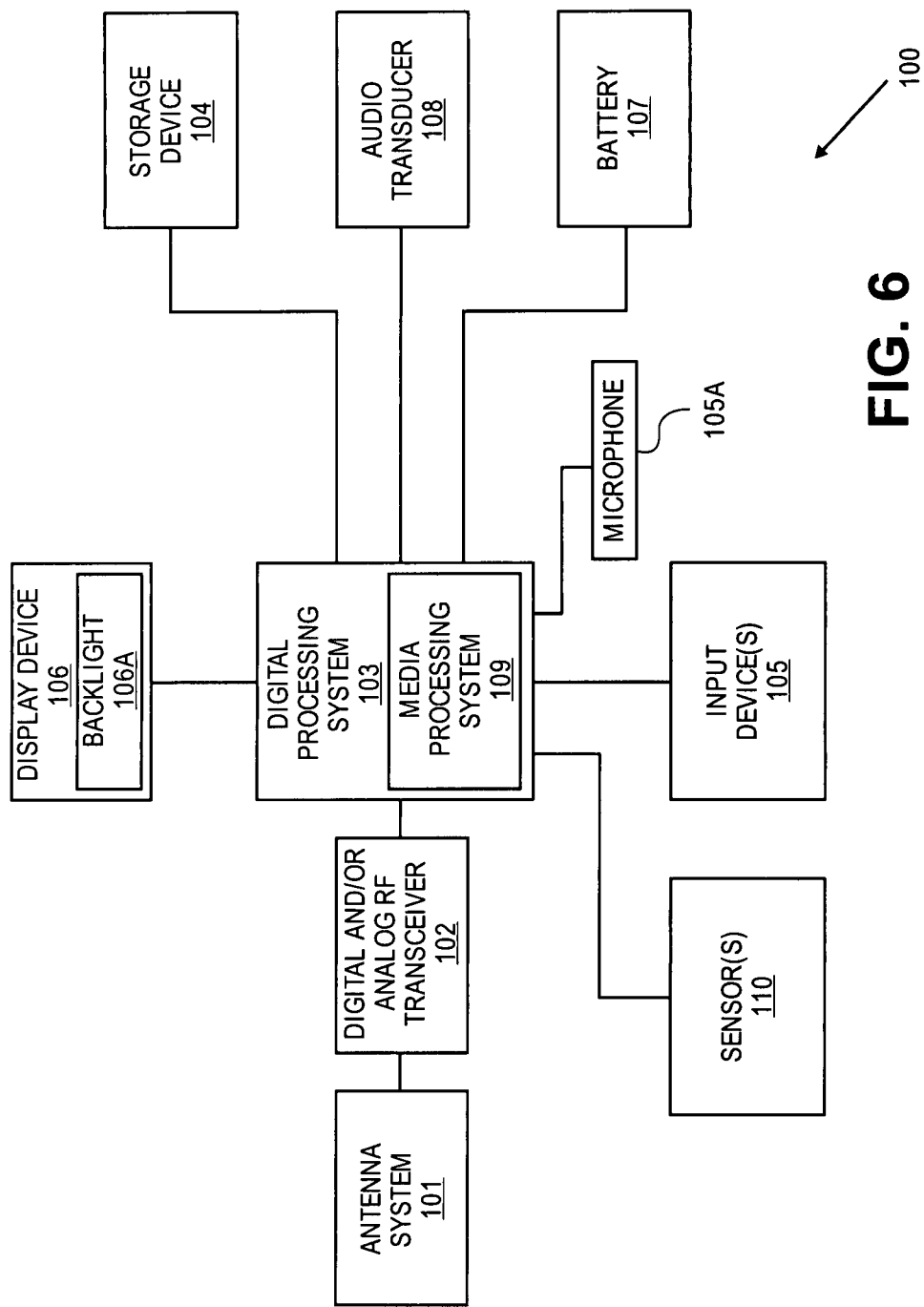

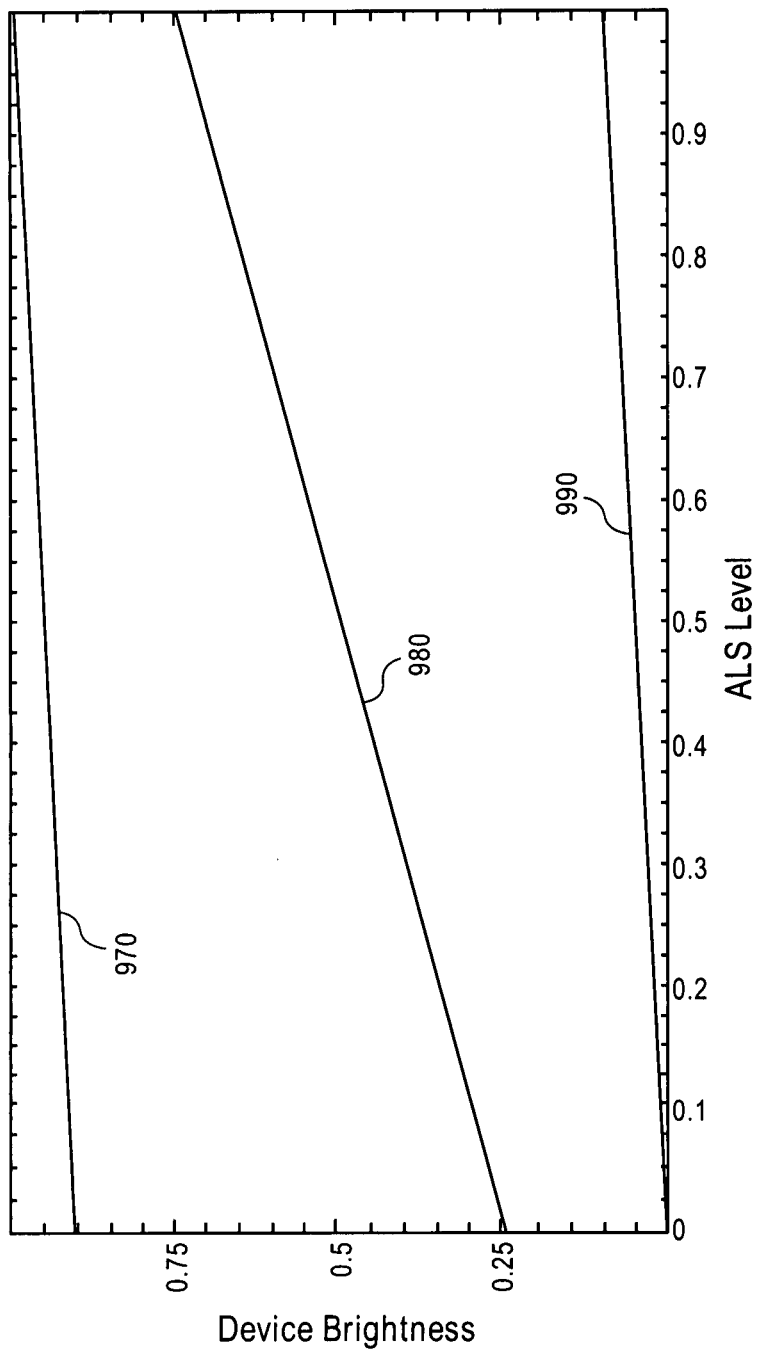

BACKLIGHT AND AMBIENT LIGHT SENSOR SYSTEM

CROSS-REFERENCE TO RELATED APPLICATION

This application is a Continuation-in-Part of U.S. patent application Ser. No. 11/650,014 filed Jan. 5, 2007 now U.S. Pat. No. 8,031,164 entitled "Backlight and Ambient Light Sensor System", which issued as U.S. Pat. No. 8,031,164, on Oct. 4, 2011.

BACKGROUND OF THE INVENTION

1. Field of the Invention

This invention relates to the field of electronic devices and, in particular, to systems and methods for operating a display device of a portable device.

2. Description of Related Art

Electronic portable and non-portable devices, such as computers and cell phones, are becoming increasingly common. Such portable devices have grown more complex over time, incorporating many features including, for example, MP3 player capabilities, web browsing capabilities, capabilities of personal digital assistants (PDAs) and the like.

The battery life of these portable devices, however, can be limited. Often, the primary draw of battery power is the display device for these portable devices and, in particular, the backlight, which can be used to illuminate the display device. The display device may also be a significant draw of power for non-portable electronic devices. The backlight may provide a background light or color over which text, pictures and/or images are displayed. In many current portable devices, an exemplary process 10 for illuminating the display is shown in FIG. 1A. In this process, the backlight is activated (e.g. turned on to generate light) when a user enters a key input into the electronic device as shown in operation 12. A timer is started at operation 14 in response to activating the backlight, and the electronic device determines, at operation 16, whether a time out of the timer has occurred. If the electronic device receives a user key input at operation 18, the timer restarts (in operation 14) and the process continues as described above. If the electronic device does not receive a user input while the timer is counting, the time out will occur, and the backlight is deactivated at operation 19.

Some of these electronic devices may also include multiple sensors which are used to detect the environment or context associated with these electronic devices. For example, U.S. patent application publication no. 2005/0219228 describes a device which includes many sensors, including a proximity sensor and a light sensor. The outputs from the sensors are processed to determine a device environment or context. The light sensor detects ambient light levels and the proximity sensor detects a proximity to an object, such as a user's ear or face. In this case, there are two separate sensors which require two openings in the housing of the device. This is shown in FIG. 1B, which shows a device 20. The device 20 includes a proximity sensor 22 mounted on a surface of the device 20 and an ambient light sensor 24 also mounted on the surface of the device 20. Each of these sensors is distinct from the other, and separate openings in the surface are needed for each sensor.

BRIEF SUMMARY OF THE INVENTION

The various apparatuses, software and methods described herein relate to operating a display of an apparatus which receives user input, senses proximity and detects light, such as ambient light, and to systems, such as data processing systems, which use software which changes display control parameters of an electronic device according to the user input and an ambient light level.

According to some embodiments of the inventions, a method of operating a display device of an electronic device, includes receiving a user setting of a display control parameter, and altering, based on the user setting, an effect of an ambient light sensor value (ALS) on control of the display control parameter. Also, the setting may be a change of the user setting and the altering may automatically be caused by the change. Moreover, the display control parameter may be the physical brightness level of a backlight of a display of a portable device. In some cases, the display control parameter may be proportional to the user setting and the light sensor value. The method may additionally include displaying a physical brightness level of a backlight of a display of an electronic device according to the display control parameter.

Further, according to some embodiments of the inventions, a method of operating a display of an electronic device may include receiving a change to a user selected brightness level of a display brightness level, and altering, according to the change, an effect of an ambient light sensor (ALS) output weight of an ambient light sensor output level on control of the display brightness level. Also, the brightness level may be automatically altered for a display of a portable device, and the method may also include receiving a plurality of ambient light sensor output levels from a plurality of ambient light sensors, weighting each of the plurality of ambient light sensor outputs depending on a location of each of the plurality of ambient light sensors on the device, and setting the ambient light sensor output level to an aggregate of the weighted plurality of ambient light sensor outputs. It is also considered that the physical brightness level may be proportional to the ambient light sensor output level times the weight, and an increase in the user selected brightness level automatically decreases the ambient light sensor output weight according to a linear relationship or automatically alters the ambient light sensor output weight according to a "bell" shaped curve relationship.

Likewise, according to embodiments of the inventions, a method of operating a display of an electronic device includes receiving a change to display brightness output level or an ambient light sensor output level, and altering, according to the change, wherein the display contrast output level is based on the display brightness output level and the ambient light sensor output level. Moreover, an increase in the display brightness output level may automatically cause a decrease in the display contrast output level, and/or an increase in the sensor output level may automatically cause an increase in the display contrast output level.

According to some embodiments of the inventions, a method of operating a display of an electronic device may include receiving a user input to control a user interface feature level, and setting a weight of a light sensor (ALS) output value that the user interface feature level is based on. In some instances, the user input may be a change to a user setting and the change may automatically cause the weight to change.

According to some embodiments of the inventions, a method of operating a display device of an electronic device may include receiving a user input of a first display control parameter; and causing, as a result of the input, an effect of an ambient light sensor (ALS) value on control of a second display control parameter. The first display control parameter may be an unlock of a touch screen input capability of the display device, or a wake of the display device from an inactivity dim; and the second display control parameter may be a brightness level of the display device. According to some embodiments, the method includes, if the ALS value is greater than a lock threshold, automatically causing, based on the ALS value, an increase in the display control parameter; and if the ALS value is less than the lock threshold, automatically causing, based on the ALS value, a decrease in the display control parameter. According to some embodiments, the method includes, if the ALS value is greater than a wake threshold, automatically causing, based on the ALS value, a first increase in the display control parameter; and if the ALS value is less than the wake threshold, automatically causing, not based on the ALS value, a predetermined second increase in the display control parameter, wherein the second increase is less than the first increase.

Next, according to some embodiments of the inventions, a method of operating a display device of an electronic device may include receiving an ambient light sensor (ALS) value change and, if the change is an increase, automatically altering, based on the ALS value change, an effect of the ALS value change on control of the display control parameter; or if the change is a decrease, not automatically altering, based on the ALS value change, an effect of the ALS value change on control of the display control parameter. According to some embodiments, the method includes, if the value change is greater than a predetermined transition threshold, automatically causing, based on the value change, an increase in the display control parameter; and if the value change is less than the predetermined transition threshold, causing the display control parameter to not become brighter or dimmer.

Finally, in some embodiments, a method of operating a proximity sensor of an electronic device includes receiving a light sensor output, and altering, according to the output, an on/off setting of a proximity sensor.

Other apparatuses, data processing systems, methods and machine readable media are also described.

BRIEF DESCRIPTION OF THE DRAWINGS

The present invention is illustrated by way of example and not limitation in the figures of the accompanying drawings in which like references indicate similar elements.

FIG. 6 is a block diagram of a system in which embodiments of the present invention can be implemented;

FIG. 9C shows examples of device physical brightness level ranges versus ALS output level range for a "bell" shaped curve relationship between ALS weight and user selected brightness;

DETAILED DESCRIPTION

Figure 1A:
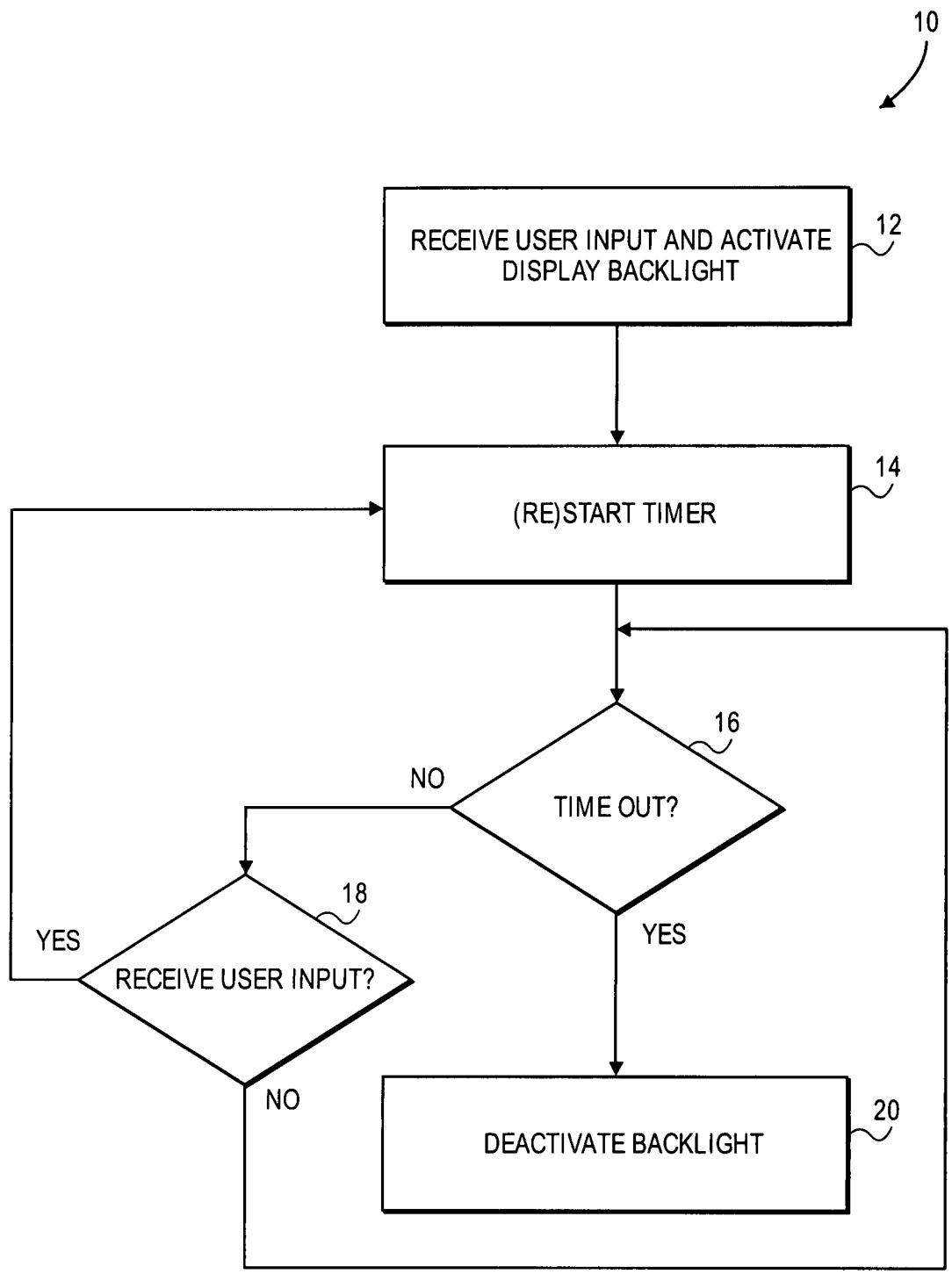
FIG. 1A is flow chart of a prior art method for responding to user input and controlling the backlight of a display in response to the user input.
Figure 1B:
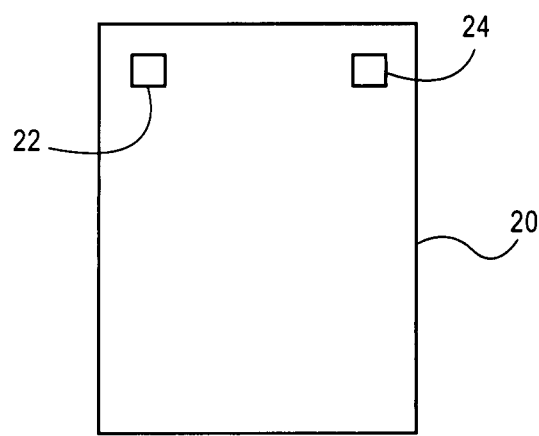
FIG. 1B shows an example of a prior art device which includes two separate sensors.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, processed, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving" or "altering" or "processing" or "computing" or "calculating" or "determining" or "displaying" or the like, can refer to the action and processes of a data processing device or system, or similar electronic device, that manipulates and transforms data represented as physical (electronic) quantities within the system's registers, storage devices, and memories into other data similarly represented as physical quantities within the system's memories, storage devices, or registers or other such information storage, transmission or display devices.

The present invention can relate to an apparatus for performing one or more of the acts or operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), flash memory, erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone (s). Examples of a portable media player are described in published U.S. patent application numbers 2003/0095096 and 2004/0224638, both of which are incorporated herein by reference.

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device).

Figure 2:
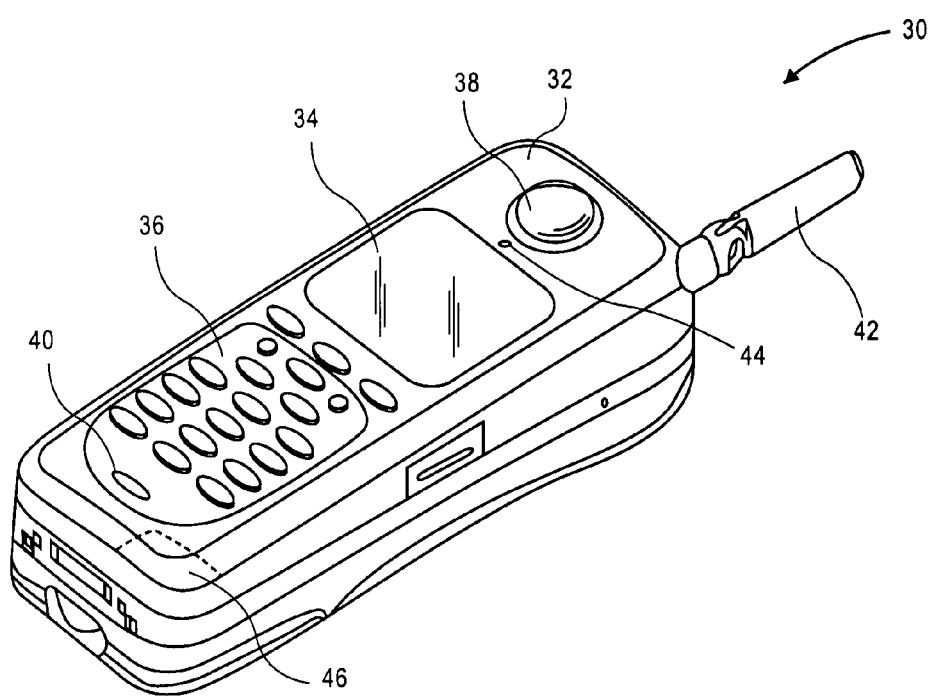
FIG. 2 is a perspective view of a portable device in accordance with one embodiment of the present invention.

FIG. 2 illustrates a portable device 30 according to one embodiment of the invention. FIG. 2 shows a wireless device in a telephone configuration having a "candy-bar" style. In FIG. 2, the wireless device 30 may include various features such as a housing 32, a display device 34, an input device 36 which may be an alphanumeric keypad, a speaker 38, a microphone 40 and an antenna 42. The wireless device 30 also may include an ambient light sensor (ALS) and/or proximity sensor 44 and an accelerometer 46. It will be appreciated that the embodiment of FIG. 2 may use more or fewer sensors and may have a different form factor from the form factor shown in FIG. 2. It will also be appreciated that the particular locations of the above-described features may vary in alternative embodiments.

The display device 34 may be, for example, a liquid crystal display (LCD) which does not include the ability to accept inputs or a touch input screen which also includes an LCD. Device 34 may be operated as described herein and may include a backlight as described herein. The input device 36 may include, for example, buttons, switches, dials, sliders, keys or keypad, navigation pad, touch pad, touch screen, and the like.

The ALS and/or proximity sensor 44 may describe one or more ALS sensors, proximity sensors, and/or combined proximity and ALS sensors. Sensor 44 may detect location (e.g. at least one of X, Y, Z), direction of motion, speed, etc. of objects relative to the wireless device 30, and/or an ambient light environment at device 30.

Figure 3:
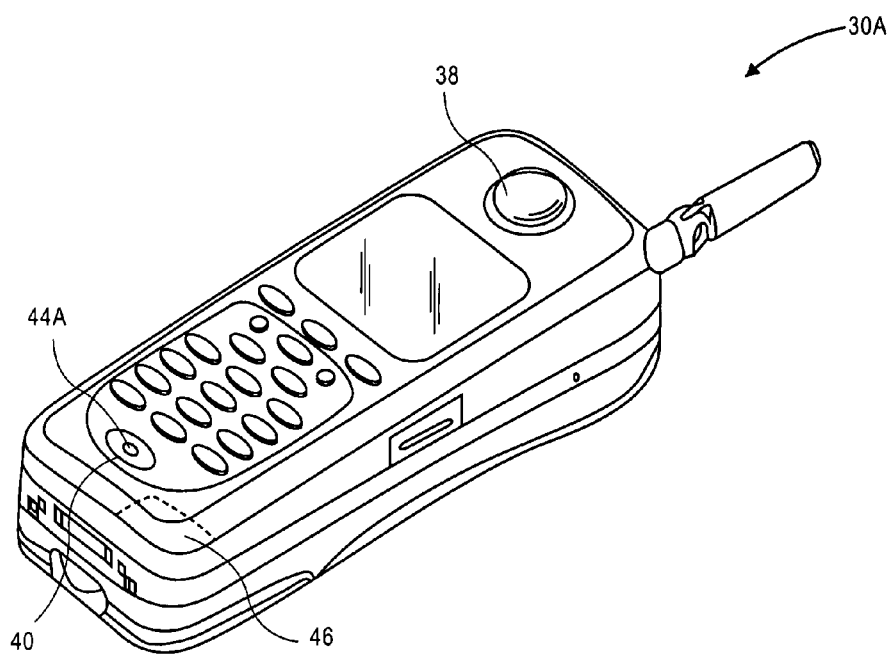
FIG. 3 is a perspective view of a portable device in accordance with one embodiment of the present invention.

In addition, a processing device (not shown) is coupled to the proximity sensor(s) 44. The processing device may be used to determine the location of objects and/or an ambient light environment relative to the portable device 30, the ALS and/or or proximity sensor 44 based on the ambient light, location and/or movement data provided by the ALS and/or proximity sensor 44. The ALS and/or proximity sensor may continuously or periodically monitor the ambient light and/or object location. The proximity sensor may also be able to determine the type of object it is detecting. The ALSs described herein may be able to detect in intensity, brightness, amplitude, or level of ambient light and/or ambient visible light, incident upon the ALS and/or display device. FIG. 3 shows an alternative portable device 30a, which is similar to the portable device 30 illustrated in FIG. 2. The portable device 30a shown in FIG. 3 can differ from the portable device 30 shown in FIG. 2 in that the ALS and/or proximity sensor 44a (FIG. 3) is located at or near the microphone 40.

Figure 4:
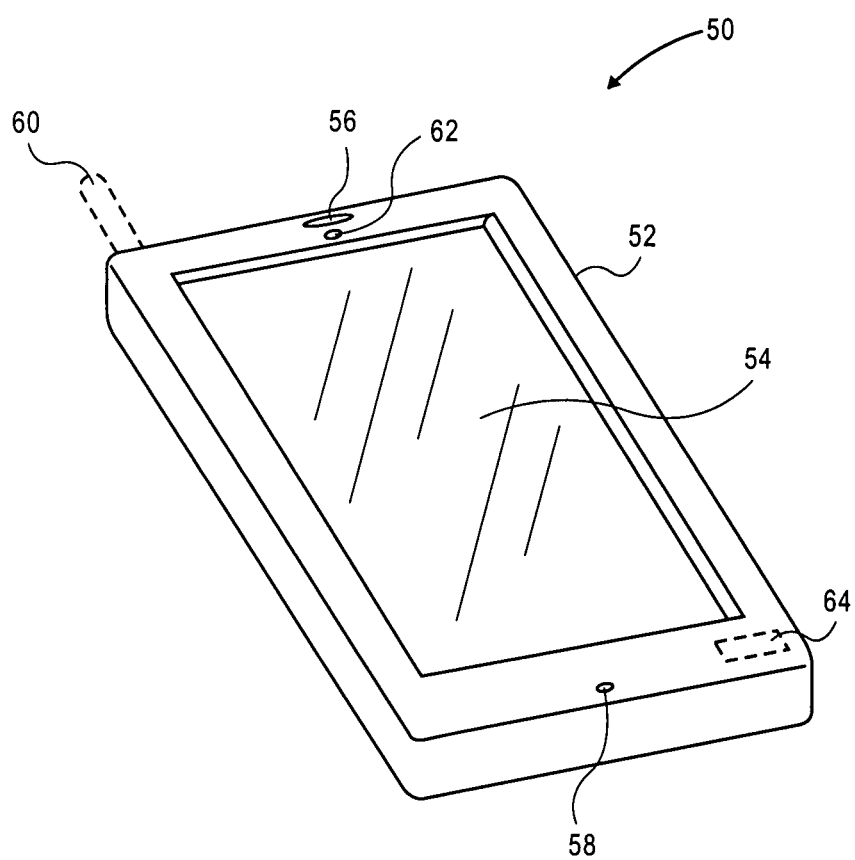
FIG. 4 is a perspective view of a portable device in accordance with one embodiment of the present invention.

FIG. 4 shows a portable device 50 in accordance with one embodiment of the invention. The portable device 50 may include a housing 52, a display/input device 54, a speaker 56, a microphone 58 and an optional antenna 60 (which may be visible on the exterior of the housing or may be concealed within the housing). The portable device 50 also may include an ALS and/or proximity sensor 62 and an accelerometer 64. The portable device 50 may be a cellular telephone or a device which is an integrated PDA and a cellular telephone or a device which is an integrated media player and a cellular telephone or a device which is both an entertainment system (e.g. for playing games) and a cellular telephone, or the portable device 50 may be other types of devices described herein. In one particular embodiment, the portable device 50 may include a cellular telephone and a media player and a PDA, all contained within the housing 52. The portable device 50 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer and an iPod are portable devices.

In one embodiment, the display/input device 54 may include a multi-point touch input screen in addition to being a display, such as an LCD. Device 54 may be described as or include a touch screen, display device and/or "screen". More particularly, herein a display device (e.g., see FIGS. 9-11, without limitation thereto) may describe a display or screen having the functionality of a touch screen (e.g., a multi-point touch input screen), such as device 54. A processing device (not shown) may be coupled to the display/input device 54.

The processing device may be used to calculate proximity, ALS and/or touches on the touch panel or touch screen.

The data acquired from the ALS and/or proximity sensor 62 and the display/input device 54 can be combined to gather information about the user's location (e.g., about the ambient light environment of the user, device, and/or display) and activities as described herein. The data from the ALS and/or proximity sensor 62 and the display/input device 54 can be used to change one or more settings of the portable device 50, such as, for example, change an illumination or backlight setting of the display/input device 54.

In embodiments, the display/input device 54 occupies a large portion, substantially all of, or at least 75% of one surface (e.g. the top surface) of the housing 52 of the portable device 50. In an alternate embodiment the display/input device can occupies less than 75%, of one surface (e.g. the top surface) of the housing 52 of the portable device 50. Also, in alternative embodiments, the portable device 50 may include a display which does not have input capabilities, but the display still occupies a large portion of one surface of the portable device 50. In this case, the portable device 50 may include other types of input devices such as a QWERTY keyboard or other types of keyboard which slide out or swing out from a portion of the portable device 50.

Figure 5A:
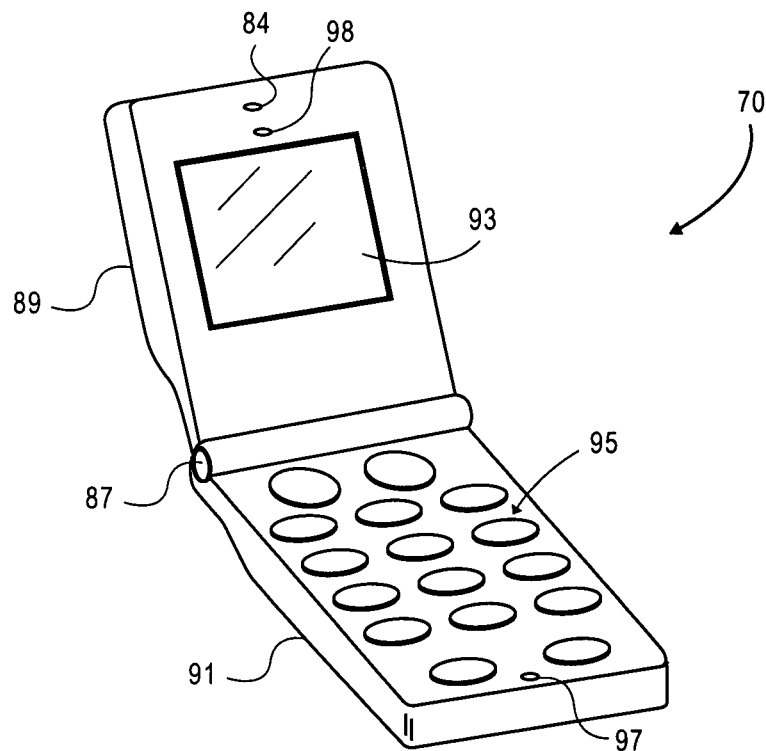
FIG. 5A is a perspective view of a portable device in a first configuration (e.g. in an open configuration) in accordance with one embodiment of the present invention.
Figure 5B:
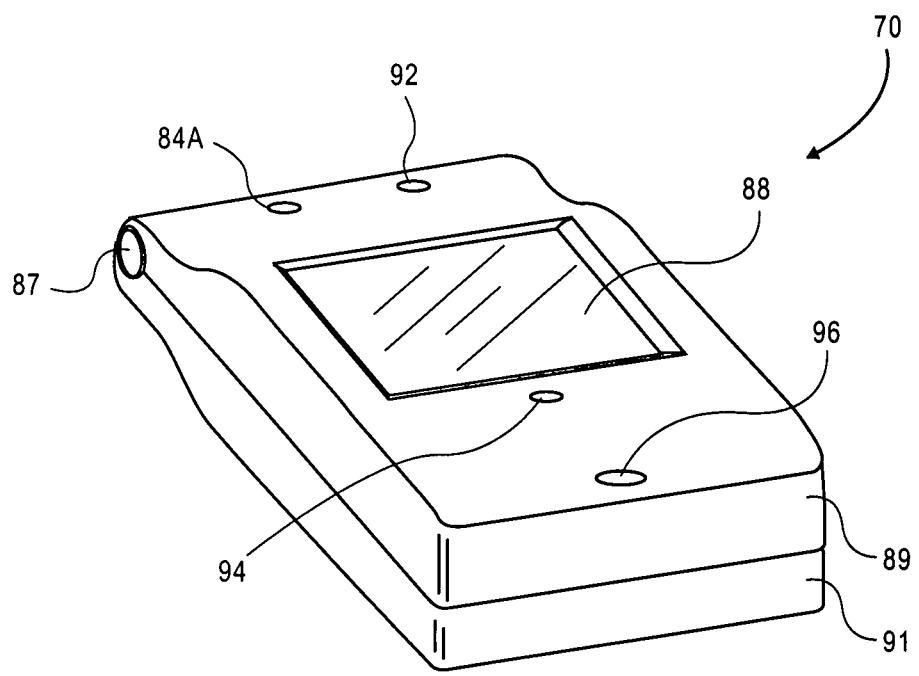
FIG. 5B is a perspective view of the portable device of FIG. 5A in a second configuration (e.g. a closed configuration) in accordance with one embodiment of the present invention.

FIGS. 5A and 5B illustrate a portable device 70 according to one embodiment of the invention. The portable device 70 may be a cellular telephone which includes a hinge 87 that couples a display housing 89 to a keypad housing 91. The hinge 87 allows a user to open and close the cellular telephone so that it can be placed in at least one of two different configurations shown in FIGS. 5A and 5B. In one particular embodiment, the hinge 87 may rotatably couple the display housing to the keypad housing. In particular, a user can open the cellular telephone to place it in the open configuration shown in FIG. 5A and can close the cellular telephone to place it in the closed configuration shown in FIG. 5B. The keypad housing 91 may include a keypad 95 which receives inputs (e.g. telephone number inputs or other alphanumeric inputs) from a user and a microphone 97 which receives voice input from the user. The display housing 89 may include, on its interior surface, a display 93 (e.g. an LCD) and a speaker 98 and an ALS and/or proximity sensor 84; on its exterior surface, the display housing 89 may include a speaker 96, a temperature sensor 94, a display 88 (e.g. another LCD), an ambient light sensor 92, and an ALS and/or proximity sensor 84A. Hence, in this embodiment, the display housing 89 may include a first ALS and/or proximity sensor on its interior surface and a second ALS and/or proximity sensor on its exterior surface. The first ALS and/or proximity sensor may be used to detect an ambient light environment and/or a user's head or ear being within a certain distance of the first ALS and/or proximity sensor and to cause an illumination setting of displays 93 and 88 to be changed (automatically in some cases) in response to this detecting.

In at least certain embodiments, the portable device 70 may contain components which provide one or more of the functions of a wireless communication device such as a cellular telephone, a media player, an entertainment system, a PDA, or other types of devices described herein. In one implementation of an embodiment, the portable device 70 may be a cellular telephone integrated with a media player which plays MP3 files, such as MP3 music files.

It is also considered that and electronic device or portable device described herein, such as the devices shown in FIGS. 2, 3, 4, 5A and 5B, may have a form factor or configuration having a "candy-bar" style, a "flip-phone" style, a "sliding" form, and or a "swinging" form. For example, a "candy-bar" style may be described above in FIG. 2 for wireless device 30. Also, a "flip-phone" style may be described above in FIGS. 5A and 5B for device 70. A "sliding" form may describe where a keypad portion of a device slides away from another portion (e.g., the other portion including a display) of the device, such as by sliding along guides or rails on one of the portions. A "swinging" form may describe where a keypad portion of a device swings sideways away (as opposed to the "flip-phone" style swinging up and down) from another portion (e.g., the other portion including a display) of the device, such as by swinging on a hinge attaching the portions.

Each of the devices shown in FIGS. 2, 3, 4, 5A and 5B may be a wireless communication device, such as a cellular telephone, and may include a plurality of components which provide a capability for wireless communication. FIG. 6 shows an embodiment of a wireless device 100 which includes the capability for wireless communication. The wireless device 100 may be included in any one of the devices shown in FIGS. 2, 3, 4, 5A and 5B, although alternative embodiments of those devices of FIGS. 2-5B may include more or fewer components than the wireless device 100.

Wireless device 100 may include an antenna system 101. Wireless device 100 may also include one or more digital and/or analog radio frequency (RF) transceivers 102, coupled to the antenna system 101, to transmit and/or receive voice, digital data and/or media signals through antenna system 101. Transceivers 102, may include on or more infrared (IR) transceivers, WHYFI transceivers, Blue Tooth™ transceivers, and/or wireless cellular transceivers.

Wireless device 100 may also include a digital processing device or system 103 to control the digital RF transceivers and to manage the voice, digital data and/or media signals. Digital processing system 103 may be a general purpose processing device, such as a microprocessor or controller for example. Digital processing system 103 may also be a special purpose processing device, such as an ASIC (application specific integrated circuit), FPGA (field-programmable gate array) or DSP (digital signal processor). Digital processing system 103 may also include other devices, as are known in the art, to interface with other components of wireless device 100. For example, digital processing system 103 may include analog-to-digital and digital-to-analog converters to interface with other components of wireless device 100. Digital processing system 103 may include a media processing system 109, which may also include a general purpose or special purpose processing device to manage media, such as files of audio data.

Wireless device 100 may also include a storage device 104 (e.g., memory), coupled to the digital processing system, to store data and/or operating programs for the wireless device 100. Storage device 104 may be, for example, any type of solid-state or magnetic memory device.

Wireless device 100 may also include one or more input devices 105 (e.g., user interface controls, or I/O devices), coupled to the digital processing system 103, to accept user inputs (e.g., telephone numbers, names, addresses, media selections, user settings, user selected brightness levels, etc.) Input device 105 may be, for example, one or more of a keypad, a touchpad, a touch screen, a pointing device in combination with a display device or similar input device.

Wireless device 100 may also include at least one display device 106, coupled to the digital processing system 103, to display text, images, and/or video. Device 106 may display information such as messages, telephone call information, user settings, user selected brightness levels, contact information, pictures, movies and/or titles or other indicators of media being selected via the input device 105. Display device 106 may be, for example, an LCD display device. In one embodiment, display device 106 and input device 105 may be integrated together in the same device (e.g., a touch screen LCD such as a multi-touch input panel which is integrated with a display device, such as an LCD display device). Examples of a touch input panel and a display integrated together are shown in U.S. published application No. 20060097991. The display device 106 may include a backlight 106a to illuminate the display device 106 under certain circumstances. Device 106 and/or backlight 106a may be operated as described herein, such as to set, control, or alter a display parameter as described herein. It will be appreciated that the wireless device 100 may include multiple displays. The descriptions above for display 106 and backlight 106a apply to other displays described herein, including those referred to for FIGS. 2-5 and 9-11.

Wireless device 100 may also include a battery 107 to supply operating power to components of the system including digital RF transceivers 102, digital processing system 103, storage device 104, input device 105, microphone 105A, audio transducer 108, media processing system 109, sensor(s) 110, and display device 106. Battery 107 may be, for example, a rechargeable or non-rechargeable lithium or nickel metal hydride battery.

Wireless device 100 may also include one or more sensors 110 coupled to the digital processing system 103. The sensor(s) 110 may include, for example, one or more of a proximity sensor, accelerometer, touch input panel, ambient light sensor, ambient noise sensor, temperature sensor, gyroscope, a hinge detector, a position determination device, an orientation determination device, a motion sensor, a sound sensor, a radio frequency electromagnetic wave sensor, and other types of sensors and combinations thereof. Based on the data acquired by the sensor(s) 110, various responses may be performed (automatically in some cases) by the digital processing system, such as, for example, activating, deactivating, changing, controlling, and/or altering the backlight 106a. Other responses that may be performed include changing a setting of the input device 105.

Also, in some embodiments, sensors, displays, transceivers, digital processing systems, processor, processing logic, memories and/or storage device may include one or more integrated circuits disposed on one or more printed circuit boards (PCB).

Figure 7A:
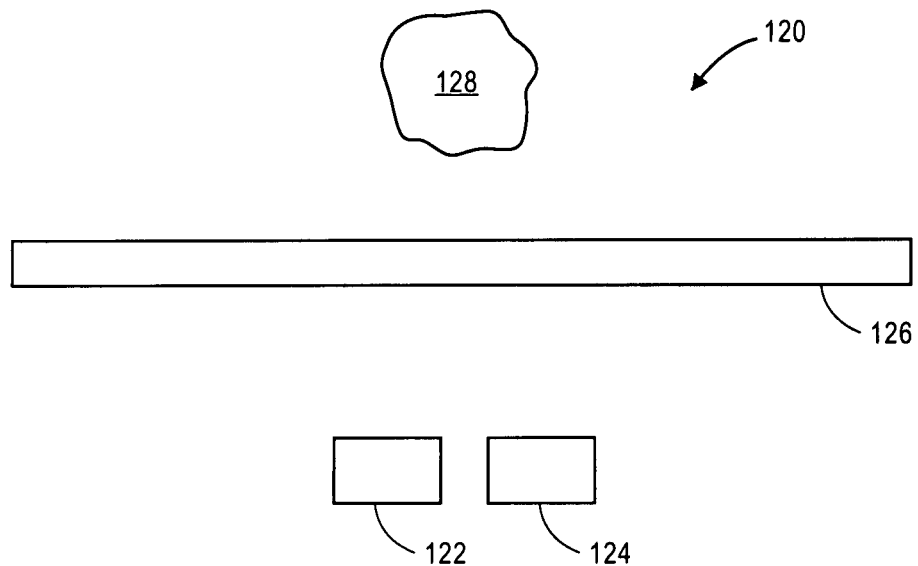
FIG. 7A is a schematic side view of a proximity sensor in accordance with one embodiment of the present invention.
Figure 7B:
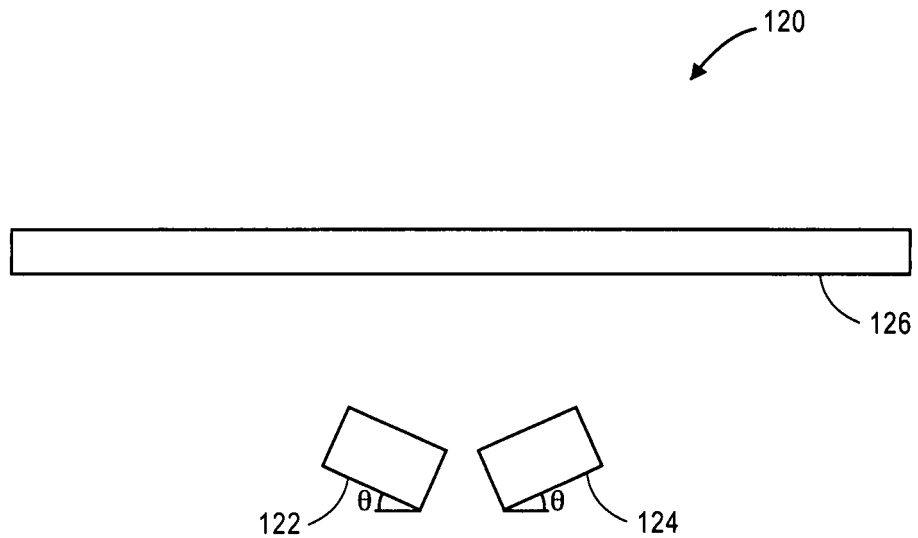
FIG. 7B is a schematic side view of an alternative proximity sensor in accordance with one embodiment of the present invention.

FIGS. 7A and 7B illustrate exemplary proximity sensors in accordance with embodiments of the invention. It will be appreciated that, in alternative embodiments, other types of proximity sensors, such as capacitive sensors or sonar-like sensors, may be used rather than the proximity sensors shown in FIGS. 7A and 7B. In FIG. 7A, the proximity sensor 120 includes an emitter 122, a detector 124, and a window 126. The emitter 122 generates light in the infrared (IR) bands, and may be, for example, a Light Emitting Diode (LED). The detector 124 is configured to detect changes in light intensity and may be, for example, a phototransistor. The window 126 may be formed from translucent or semi-translucent material. In one embodiment, the window 126 is an acoustic mesh, such as, for example, a mesh typically found with a microphone or speaker of the electronic device. In other embodiments, the window 126 may be MicroPerf, IR transparent strands wound in a mesh, or a cold mirror.

During operation, the light from the emitter 122 hits an object 128 and scatters (e.g., is reflected by the object) when the object is present above the window 126. The light from the emitter may be emitted in square wave pulses which have a known frequency, thereby allowing the detector 124 to distinguish between ambient light and light from emitter 122 which is reflected by an object, such as the user's head or ear or a material in a user's pocket, back to the detector 124. At least a portion of the scattered light is reflected towards the detector 124. The increase in light intensity is detected by the detector 124, and this is interpreted by a processing device or system (not shown in FIG. 7A) to mean an object is present within a short distance of the detector 124. If no object is present or the object is beyond a certain distance from the detector 124, an insufficient or smaller amount of the emitted light is reflected back towards the detector 124, and this is interpreted by the processing system (not shown in FIG. 7A) to mean that an object is not present or is at a relatively large distance. In each case, the proximity sensor is measuring the intensity of reflected light which is related to the distance between the object which reflects the light and detector 124.

In FIG. 7B, the emitter 122 and detector 124 of the proximity sensor are angled inward towards one another to improve detection of the reflected light, but the proximity sensor of FIG. 7B otherwise operates in a manner similar to the proximity sensor of FIG. 7A.

A proximity sensor in one embodiment of the inventions includes the ability to both sense proximity and detect electromagnetic radiation, such as ambient light, from a source other than the emitter of the proximity sensor. The use of IR light for both the emitter and the detector of the proximity sensor may be advantageous because IR light is substantially present in most sources of ambient light (such as sunshine, incandescent lamps, LED light sources, candles, and to some extent, even fluorescent lamps). Thus, the detector can detect ambient IR light, which will generally represent, in most environments, ambient light levels at wavelengths other than IR, and use the ambient IR light level to effectively and reasonably accurately represent ambient light levels at wavelengths other than IR.

Figure 7C:
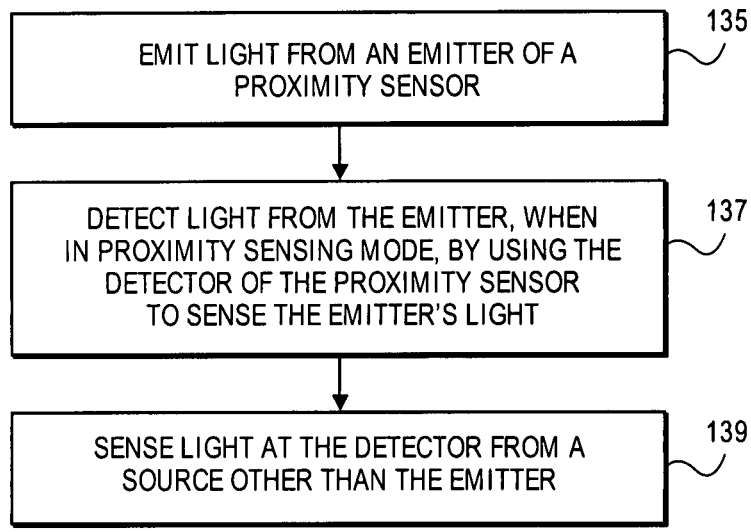
FIG. 7C is a flow chart which shows a method of operating a proximity sensor which is capable of detecting light from a source other than the emitter of the proximity sensor.
Figure 7D:
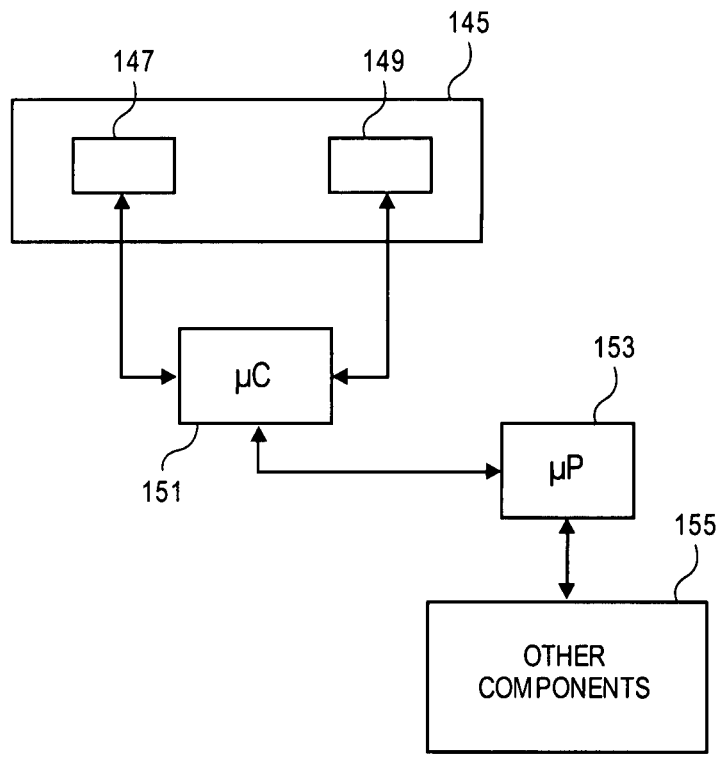
FIG. 7D shows an example of a proximity sensor with associated logic.

A method of operating a proximity sensor which includes the ability to both sense proximity and detect light is shown in FIG. 7C and an example, in block diagram form, of such a proximity sensor is shown in FIG. 7D. The method of FIG. 7C may use the proximity sensor shown in FIG. 7D or other proximity sensors. The method includes operation 135 in which electromagnetic radiation (e.g. IR light) is emitted from the emitter of the proximity sensor. The emitter may emit the radiation in a known, predetermined pattern (e.g. a train of square wave pulses of known, predetermined pulse width and frequency) which allows a detector to distinguish between ambient radiation and radiation from the emitter. In operation 137, the detector of the proximity sensor detects and measures light from the emitter when the detector is operating in proximity sensing mode. A processor coupled to the detector may process the signal from the detector to identify the known predetermined pattern of radiation from the emitter and to measure the amount of radiation from the emitter. In operation 139, the detector is used in a mode to sense radiation (e.g. ambient IR light) from a source other than the emitter; this operation may be implemented in a variety of ways. For example, the emitted light from the emitter may be disabled by a shutter (either a mechanical or electrical shutter) placed over the emitter or the emitter's power source may be turned off (thereby stopping the emission of radiation from the emitter). Alternatively, known signal processing techniques may be used to remove the effect of the emitter's emitted light which is received at the detector in order to extract out the light from sources other than the emitter. It will be appreciated that operations 135, 137 and 139 may be performed in a sequence which is different than the sequence shown in FIG. 7C.

FIG. 7D shows an embodiment of a range sensing IR proximity sensor 145 which includes the ability to sense and measure proximity and to detect and measure ambient light levels. The proximity sensor 145 includes an IR emitter 147 (e.g. an IR LED) and an IR detector 149. An optional shutter (e.g. an LCD electronic shutter) may be disposed over the emitter 147. The IR emitter 147 and the IR detector 149 may be coupled to a microcontroller 151 which may control switching between proximity sensing mode and ambient light sensing mode by either closing and opening an optional shutter or by turning on and off the power to the IR emitter 147. The output from the IR detector 149 may be provided from the microcontroller 151 to the microprocessor 153 which determines, from data from the proximity sensor 145, at least one proximity value and determines at least one ambient light level value. In an alternative embodiment, the microprocessor may be coupled to the IR emitter 147 and to the IR detector 149 without an intervening microcontroller, and the microprocessor may perform the functions of the microcontroller (e.g. the microprocessor may control switching between proximity sensing mode and ambient light sensing mode). The microprocessor 153 may be coupled to other components 155, such as input (e.g. keypad) or output (e.g. display) devices or memory devices or other sensors or a wireless transceiver system, etc. For example, the microprocessor 153 may be the main processor of the wireless device 100 shown in FIG. 6. In those embodiments in which a shutter over the IR emitter is not used and IR emissions from the IR emitter 147 are received at the IR detector 149 while the IR detector 149 is measuring ambient light levels, the microprocessor 153 (or the microcontroller 151) may filter out the known predetermined pattern of IR light from the IR emitter 147 in order to extract a signal from the IR detector 149 representing the IR light level from sources other than the IR emitter 147.

Figure 8:
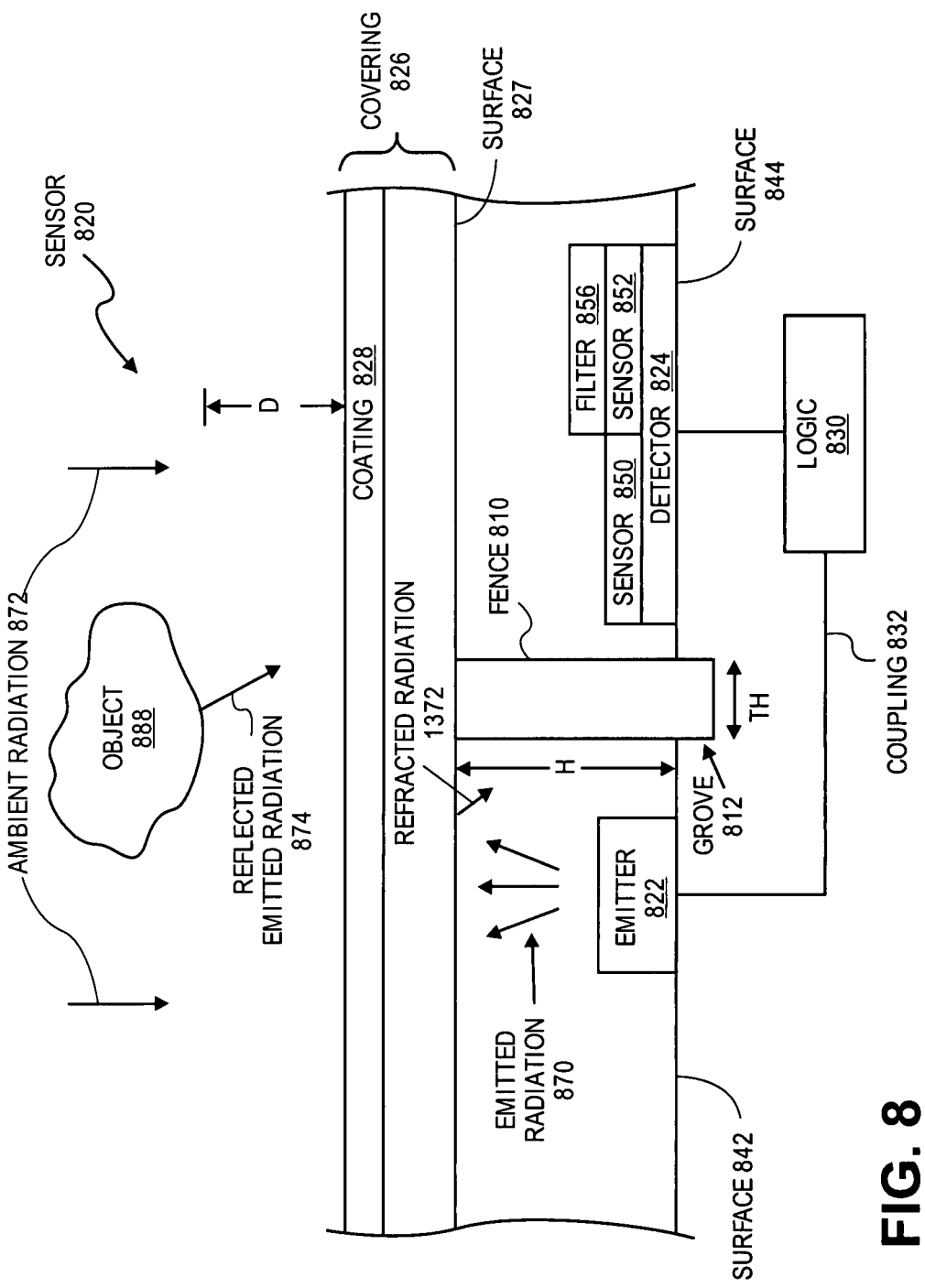
FIG. 8 is a schematic side view of a combined proximity sensor and ambient light sensor in accordance with one embodiment of the invention.

FIG. 8 is a schematic side view of a combined proximity sensor and ambient light sensor in accordance with one embodiment of the invention. FIG. 8 shows combined sensor 820 including emitter 822, detector 824 and covering 826, such as to detect the proximity of an object to the sensor and an ambient light level or intensity at the sensor. FIG. 8 also shows logic 830, such as a processor and/or processing logic for controlling, receiving, scaling, subtracting, and/or determining outputs of components of sensor 820 (e.g., emitter 822, detector 824, logic 830 and components thereof) to determine proximity and/or ambient light. FIG. 8 also shows fence 810, such as a fence that is antireflective or non-transmissive for radiation of emitter 822. Fence 810 may be a fence, a wall or a barrier disposed between the emitter and the detector, extending all the way up to covering 826. Fence 810 is optional. Covering 826 may or may not be a covering similar to covering 126, emitter 822 may or may not be an emitter similar to emitter 122 as described above for FIGS. 7A through 7D.

Emitter 822 is shown emitting emitted radiation 870 which may be refracted as refracted radiation 872 by covering 826. Emitter 822 may be an infrared (IR) light emitter or transmitter, and may emit IR light modulated at a modulation frequency. Also, radiation 870 may be reflected by object 888 as shown by reflected emitter radiation 874, which may be received by detector 824. Object 888 may be an object having proximity D and an IR light reflective surface or material, and may be an object like object 128.

FIG. 8 shows detector 824 including sensor 850, sensor 852, and filter 856. Sensor 850 may be described as a sensor configured to detect electromagnetic radiation from emitter 822, and ambient radiation 872. Sensor 852 may be a sensor as described above for sensor 850, except that sensor 852 is covered with or has filter 856 disposed between sensor 852 and radiation 870, 874, and 872. Filter 856 may be described as a passband filter for IR light, but not passing visible light, such as to pass IR light from incandescent bulbs and fluorescent bulb, as well as radiation 870 and 874, but not to pass visible light from incandescent bulbs and fluorescent bulb. Thus, sensor 852 may detect electromagnetic radiation from radiation 870, radiation 874, and/or ambient IR radiation from radiation 872, but may not receive or sense visible light from radiation 872.

Logic 830 may modulate the emitter IR light and/or to turn the emitter on and off. The IR light from radiation 872 may be filtered out or distinguished from the output of sensor 852 by logic 830. Distinguishing the emitted IR from ambient IR by detecting for emitted IR during one time period and for ambient IR during another may be described as TDM, timeslicing and multiplexing, and/or using a waveform filter. Detector 824 and/or logic 830 may be used to sense proximity of the object to combined sensor 820, and may determine a visible light intensity of ambient radiation 872.

The term "substantially" may refer to the specific value noted herein, or, in some cases, a range within 1, 2 or 5 percent of that value. The terms "processing logic" as described herein may describe a device, a processor, circuitry, software, a memory, and/or a combination of any or all of the above. Similarly, the term "sensor" may include the above descriptions for processing logic. Also, use of the term "detect" and derivations therefrom may be similar to that described herein for use of the term "sense" and derivations thereof, and vice versa.

It will be appreciated that at least some of the sensors which are used with embodiments of the inventions may determine or provide data which represents an analog value. In other words, the data represents a value which can be any one of a set of possible values which can vary continuously or substantially continuously, rather than being discrete values which have quantum, discrete jumps from one value to the next value. Further, the value represented by the data may not be predetermined. For example, a light sensor, such as an ambient light sensor, may determine or provide data that represents a light intensity which is an analog value. For other types of sensors, the data determined or provided by the sensor may represent an analog value.

Moreover, it can be appreciated that at least certain embodiments of the sensors described herein may provide proximity and/or ALS data (e.g., light levels) to a processor or processing logic of an electronic device, a display device, a data processing device, or a data processing system. This may include sending proximity sensor output data (e.g., to detect a proximity of an object) and/or ALS output level or value data (e.g., to identify an ambient light environment or level of visible light intensity, such as incident upon an ALS and/or display device) to a software application (e.g., instructions executing on a processor). Reference to a "device", an "electronic device", a "portable device", "a data processing system", a "date processing device" or a "system" herein may describe a portable device (such as a cellular phone, lap-top computer or other device having the functionality of a cellular phone, touch input screen, media player (e.g., audio such as MP-3, and/or video), personal digital assistant, and/or Internet browser, or a device described for FIGS. 2-11), non-portable device (such as a desktop computer), or a processor or software application (e.g., instructions executed by a processor) of the device referred to. Thus, the software or processor can determine, based upon the data, whether to modify a setting of the device or data processing system. For instance, the processor, software or processing logic may compare the data from one or more ALS outputs to a threshold value to determine a light value (e.g., amount of visible light). Specifically, the comparison may be used to determine when and by how much to modify (e.g., by adjusting, increasing, decreasing, turning on, turning off, or leaving status quo) at least one setting or display control parameter of a display illuminator or device (e.g., a backlight) as described herein. For instance, at least one setting or display control parameter may be modified sufficiently to cause the display to have a backlight brightness and/or contrast high enough to allow a user to see and identify text, images, and/or video displayed on the display. For instance, the following descriptions, apply to displays and backlights described herein.

As noted above, the display (e.g., a liquid crystal display (LCD)) and/or backlight of the display device may represent one of the largest battery draws or drains of a portable device and may also represent a significant power drain for a non-portable device. In these cases, the brighter the backlight, the more battery energy or power is consumed maintaining the bright level of backlight. Thus, in some embodiments, it may be beneficial to reduce the effect or amount of battery draw or drain that the backlight of the display device has on the battery. However, it may be desired to have a bright or high contrast backlight during periods to overcome a bright ambient light environment, or when desired by a user to maintain the backlight brightness or high contrast. Thus, to extend battery life and reduce battery draw, it may be helpful to only drive or use display or backlight brightness (e.g., intensity or illumination) or contrast at a maximum level or value high enough to overcome the ambient light environment at the user, device, or incident upon the display. For example, in some cases, if the user if outdoors in the sun, a bright or increased backlight brightness or high contrast may be more desirable or useful (such as to see text, images, and/or video displayed on the display) than if the user is in a brightly lit room or softly lit room.

Figure 10:
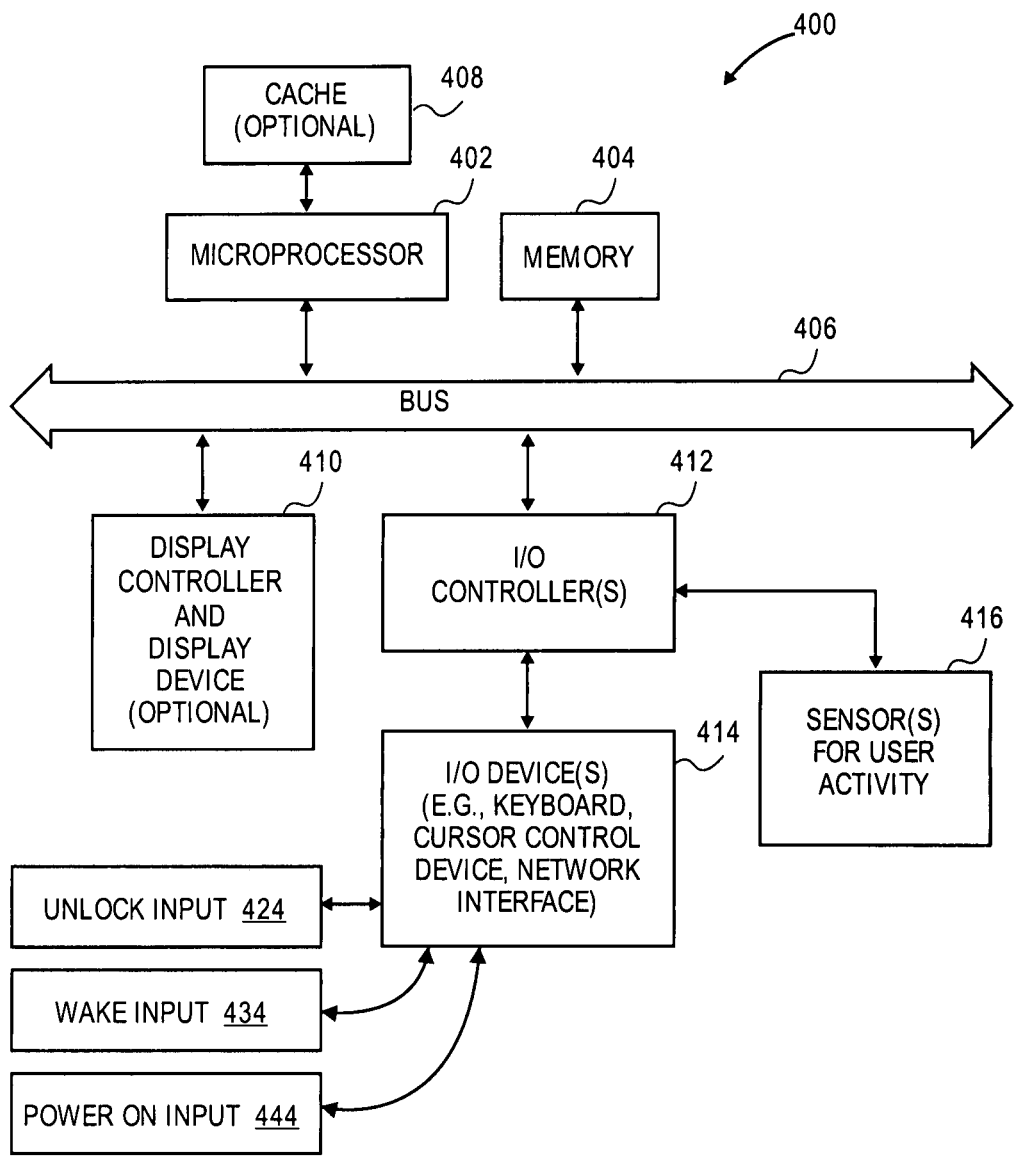
FIG. 10 is a block diagram of a digital processing system in accordance with one embodiment of the present invention.
Figure 11:
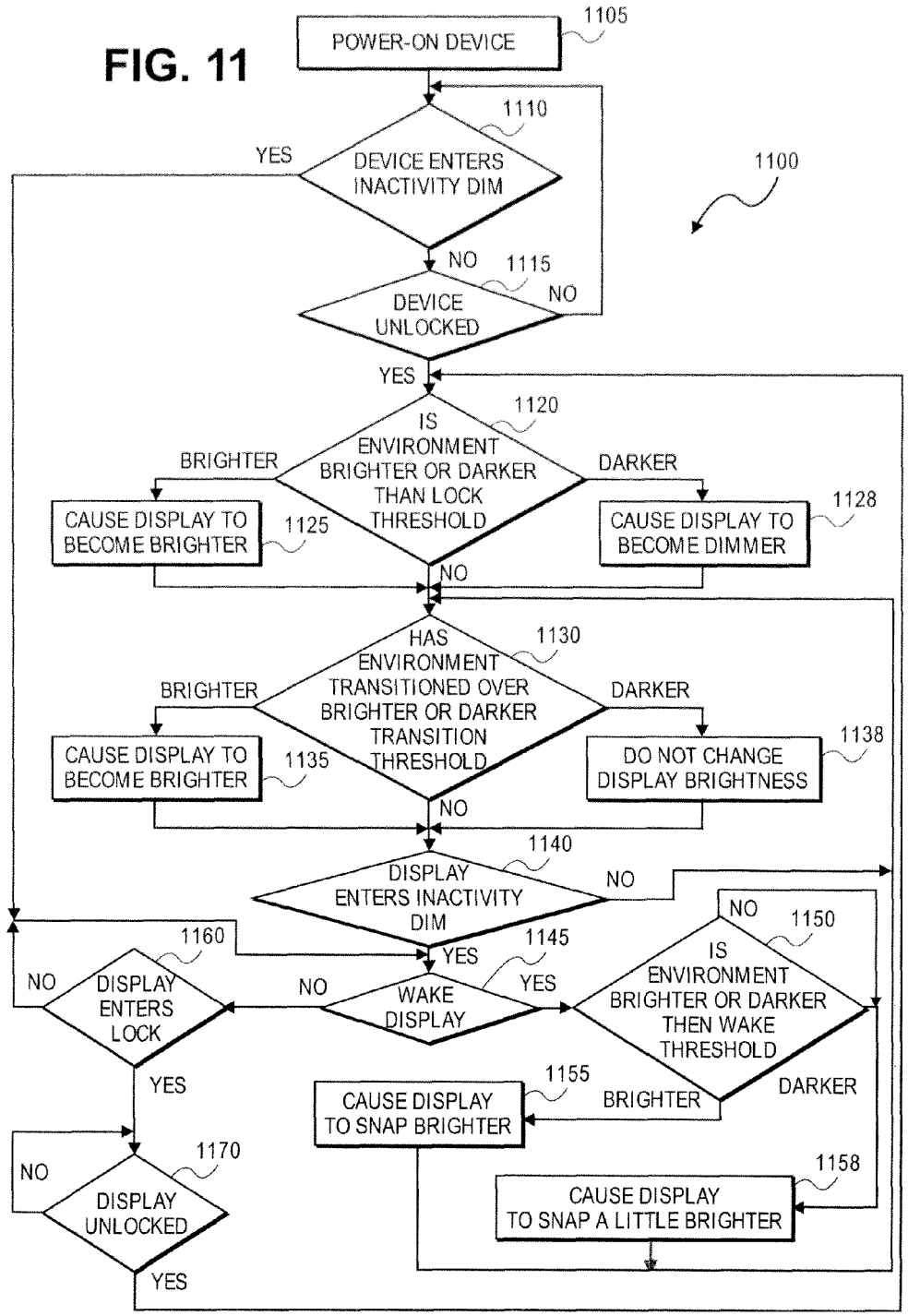
FIG. 11 is a process for operating a display device.

According to embodiments, a display device of the electronic device may be "operated" by illuminating (e.g., generating, altering (or causing not to be altered), causing, controlling, or displaying) a backlight (e.g., a level of brightness and/or contrast of the backlight or overall display) of the display device based on or considering a user input, setting (or change thereof) and/or an ambient light sensor output. FIGS. 9-11, without limitation thereto, give examples of embodiments of such operations and control. In some embodiments, based on a received user input, setting (or change thereof) and/or based on data acquired by one or more ambient light sensors, a digital processing system (e.g., an electronic device) may (automatically in some cases) activate, deactivate, change, control (e.g., cause or alter (or to cause not to be altered) an effect of an ALS value on control of a display control parameter), and/or alter one or more display control parameters of a backlight, such as according to an algorithm implemented by a software application. For instance, a backlight may have various "display control parameters" such as physical brightness level, contrast level, gamma level, and color calibration levels. These levels may be selected, controlled (e.g., by causing or altering an effect of an ALS value on control of a display control parameter), requested and/or set according to a user input, setting or level (or change thereof). In addition, these parameters may be set, altered, or controlled by sensor outputs, which may be weighted based on or according to the user setting or selection. Specifically, an electronic device may receive a user input or setting (or change thereof) of a display control parameter and may cause or alter, based on the user input or setting (or change thereof), an affect of a light sensor value on control of the same or a different display control parameter. As a result, the device may set or alter (e.g., by changing, controlling, or adjusting) the display control parameter based on (e.g., according to, caused by, or due to) the user input or setting (or change thereof) and the ALS value (or change thereof). Moreover, the ALS value may be a weighted value, weighted based on or according to the received user setting or selection. The amount of weighting may be described as an ALS weight to the ALS value.

The parameter may be altered automatically, such as by a device, a processor, and/or software. Alternatively the parameter may be altered non-automatically, such as by receiving a user selection to cause the alteration. For instance, upon determining that an alteration is to be made, the device, processor, and/or software may prompt the user to confirm or select the alteration. Upon receipt of the user confirmation or selection, the alteration occurs (e.g., it is optional until user selection). In some embodiment, without limitation thereto, an ALS, setting, or environment "level", "output", "value", or "reading" may be used synonymously, such as when referring to ambient light. It can be appreciated that in other embodiments, those terms may not by synonymous.

Ambient light level data may be provided by an ambient light sensor, which indicates the level of light intensity surrounding that sensor. Ambient light data may also be obtained from two or more ambient light sensors, which are disposed at different positions on the device. An adjustable backlight brightness may be provided by altering the backlight brightness based on or according to the output of one or more than one ALS on the electronic device. The number of outputs may be weighted depending on or based on the location of each sensor on the device. For example, one ambient light sensor may be on one side of the device, and another ambient light sensor may be on another side of the device. ALS sensor on the face of the device pointing at the user (and/or away from a display) may be given a higher weight as it or they best represent light falling directly on the display or a cover of the display. For example, see sensors 44, 44a, 62, 84 of FIGS. 2-5A respectively. Alternatively, sensors facing the ground may be given lower weights, as they face away from light incident upon the display. For example, these sensors may be sensors on a surface opposite that on which sensors 44, 44a, 62, 84 are mounted or disposed, of FIGS. 2-5A respectively. Sensors not pointing at the user, away from a display, or toward the ground may be given a weight between a weight given to a sensor pointing at the user (and/or away from a display) and a sensor pointing toward the ground. For example, these sensors may be sensors on a surface sideways or perpendicular to that on which sensors 44, 44a, 62, 84 are mounted or disposed, of FIGS. 2-5A respectively. It is also considered that the definition of where a sensor is pointing may change due to the orientation, sliding, opening, or closing of a portion of an electronic device. For instance, in FIG. 5A (e.g., when the device is open or on), sensor 84 may be pointing at the user, while a sensor on a surface opposite that on which sensors 84 is mounted (e.g., sensors 84A and 92) may be pointing toward the ground. Alternatively, in FIG. 5B (e.g., when the device is closed or off), sensor 84A may be pointing at the user, while a sensor on a surface opposite that on which sensors 84A and 92 are mounted may be pointing toward the ground. In this case, sensor 84 is pointing towards in interior surface of the device and may not be considered or may have a zero weight.

According to some embodiments, a backlight brightness level of a display may be determined according to, or by considering 1) ambient light sensor data; 2) the percentage of overall control or weight the ambient light sensor data has on the brightness; and 3) a user requested system backlight level. In addition, the electronic device settings or mode may also have an affect on the brightness of the backlight level.

According to embodiments, the display control parameter depends on (e.g., is controlled by, is related to, considers, or is according) to both the ALS weight and the ALS value (e.g., a multiple of the weight and value). The display control parameter may or may not be offset or depend on (e.g., be weighted by) a constant.

Figure 9A:
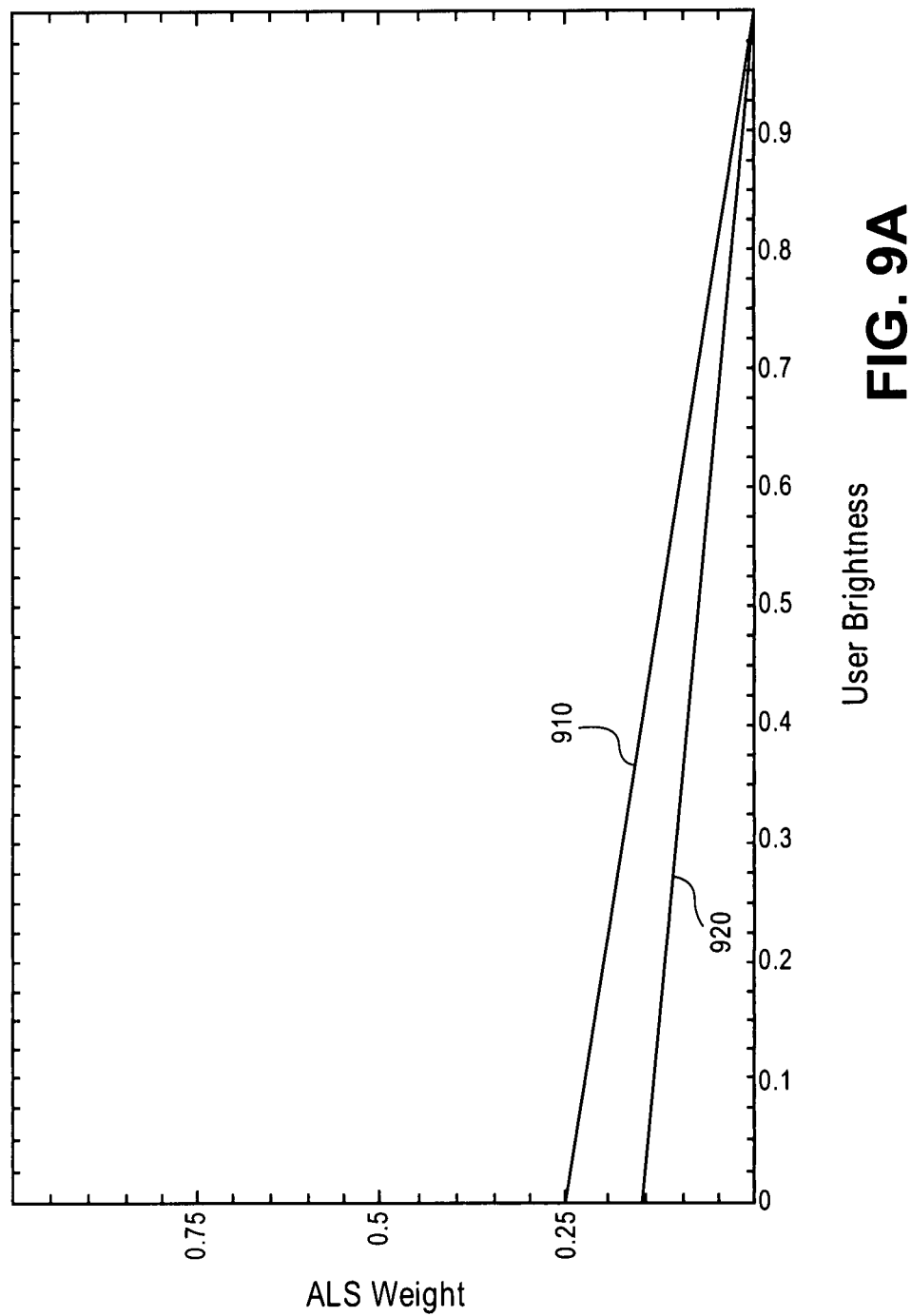
FIG. 9A is a graph showing examples of ambient light sensor (ALS) weight ranges versus user selected brightness range according to a linear relationship.

FIG. 9A is a graph showing examples of ambient light sensor (ALS) weight ranges versus user selected brightness range according to a linear relationship. For instance, in some embodiments, the ALS value is only allowed to control a maximum percent of the display control parameter (e.g., of a physical brightness and/or contrast level). This may be an instance where it is desired to not let the display control parameter drop below 75%. This example can be represented by line 910 of FIG. 9A. Line 910 shows that where the user selects a brightness of 1.0 or 100%, the ALS weight is not a factor in the display control parameter, but as the user selected brightness decreases, the weight increases up to having a 25% affect on altering the display control parameter. For instance, a display control parameter resulting from implementing line 910 may be generalized as equation (a):

$$\text{display control parameter} = K + (\text{ALS weight} \times \text{ALS value}) \quad (a)$$

Here, the display control parameter is constant K plus (ALS weight times ALS value). Some cases consider that the ALS output weight may be inversely related to a range of the user selected brightness level increase. Moreover, this relationship may be proportional or linear (e.g., wherein a range of the ambient light sensor output weight is linearly inversely proportional to a range of the user selected brightness level).

Also, the ALS weight and user brightness may be each normalized (e.g., providing an user brightness value and an ALS weight in a range between 0 and 1.0). These normalized values may be based on a received user setting, input or selected brightness level, such as shown for FIG. 9A. For instance, in the example above, according to equation (a), the constant K is 75%, the maximum ALS weight is 25%. Thus, depending on the ALS value, the display control parameter will change between 75% and 100%, increasing linearly as the ALS value increases. For example, in the brightest sunlight where the ALS value is 1.0, the parameter will be 100% (e.g., in an ambient light environment of bright sunlight). Alternatively, in an ambient light environment within a dark room (e.g., a softly lit room) where the ALS value is 0.2, the parameter will be 80%. Thus, the ALS weight may be described as an affect, scaling, factor, control or adjustment of the light sensor value on the display control parameter. Notably, the display control parameter may be a physical brightness level of a backlight of a display, and the user setting may be a requested physical brightness level of the backlight.

Although line 910 is shown decreasing from the maximum weight percent to zero, it is considered that the line may have a greater negative slope or be shifted down. For instance, although the weight value has a maximum along the graph axis, the minimum may be at a percent of user selected brightness less than 100%, and the line may have the same slope as shown (thus the maximum weight value is less than shown for that line) or may have a more negative slope (for the same maximum weight value). Line 910 is shown as a straight line, but it can be appreciated that a curved or less than linear relationship can be used in place of 910, where the weight is inversely related to the user selected brightness level, but not in a linear relationship.

Also, in some cases, the display parameter or physical brightness level is multiplied by a system requested backlight level, such as a level requested by the device, processor, or application due to factors other than the user setting, ALS level, and ALS weight. For example, the system requested level may be a device setting for the display of a fully bright level (e.g., 100% brightness device setting), a dimmed display level (e.g., 10% of brightness for the display setting), or an off display level (e.g., 0% brightness device setting) requested or selected by the device, processor, or application due to an output of a different sensor. Specifically, a proximity sensor and/or light sensors may indicate that the device is closed, off, not being used, in a pocket, or next to a person's face or ear. Thus, the off display level may be selected. Alternatively, the device may have been idle or not used for a period of time after which the dimmed display is selected. By multiplying the parameter of equation (a) by the 10% dimmed level, the dimming would now be an 8%, backlight level. Alternatively, at the 100% level, the parameter of equation (a) would be the brightness level, and at an off display level, there would be 0% brightness regardless of equation (a).

According to embodiments, a system requested level or device setting affecting the backlight brightness or a display parameter may be related to a type of application executing on the device and/or being displaying on the display device. For example, a type of application (and respective brightness) may include primarily textual content display (low), primarily image or picture content display (high), primarily video content display (high), primarily color content display (normal/middle), and/or primarily black and white content display (low). A combination of these types is also considered, such as where the respective brightness may be an aggregate depending on the types included (e.g., black and white text uses a lower brightness than images, video, or a color display).

Further refinements include considering adjusting how much maximum control the ALS value can have on brightness. For example, line 920 shows an instance where the maximum amount of control is 15%. Thus, the ALS can adjust the brightness between 85% and 100%. Other than the 15% control change, the description above with respect to line 910 applies to line 920 and a control parameter, brightness, user setting, ALS value and ALS weight apply.

Thus, if the device receives a higher overall backlight level input or request from the user, the amount of control the ALS has on the final backlight level is decreased. Alternatively, if the device receives a lower level setting or request from the user, the ALS level is given more control to provide the user with a backlight level only high enough to allow the user to see the display image or text, thus conserving battery life. In other words, as shown in FIG. 9A, a change in the user setting or selected brightness causes a change in the ALS weight, which alters an affect of the ALS value on controlling (e.g., altering, changing or adjusting) the display control parameter or brightness. Consequently, the application or processor may cause the display device to display the physical brightness level of the backlight according to or based on the display control parameter or as described herein. Specifically, the backlight physical brightness will be based on the user selected brightness level, the ambient light sensor weight, and the ambient light sensor value, where a change in the user selected brightness level causes a change in the ambient light sensor output weight. Thus, the brightness level may be altered based on a change in the weight, in the ambient light sensor output level, in the user selected brightness level, and/or in a device setting for the display.

Figure 9B:
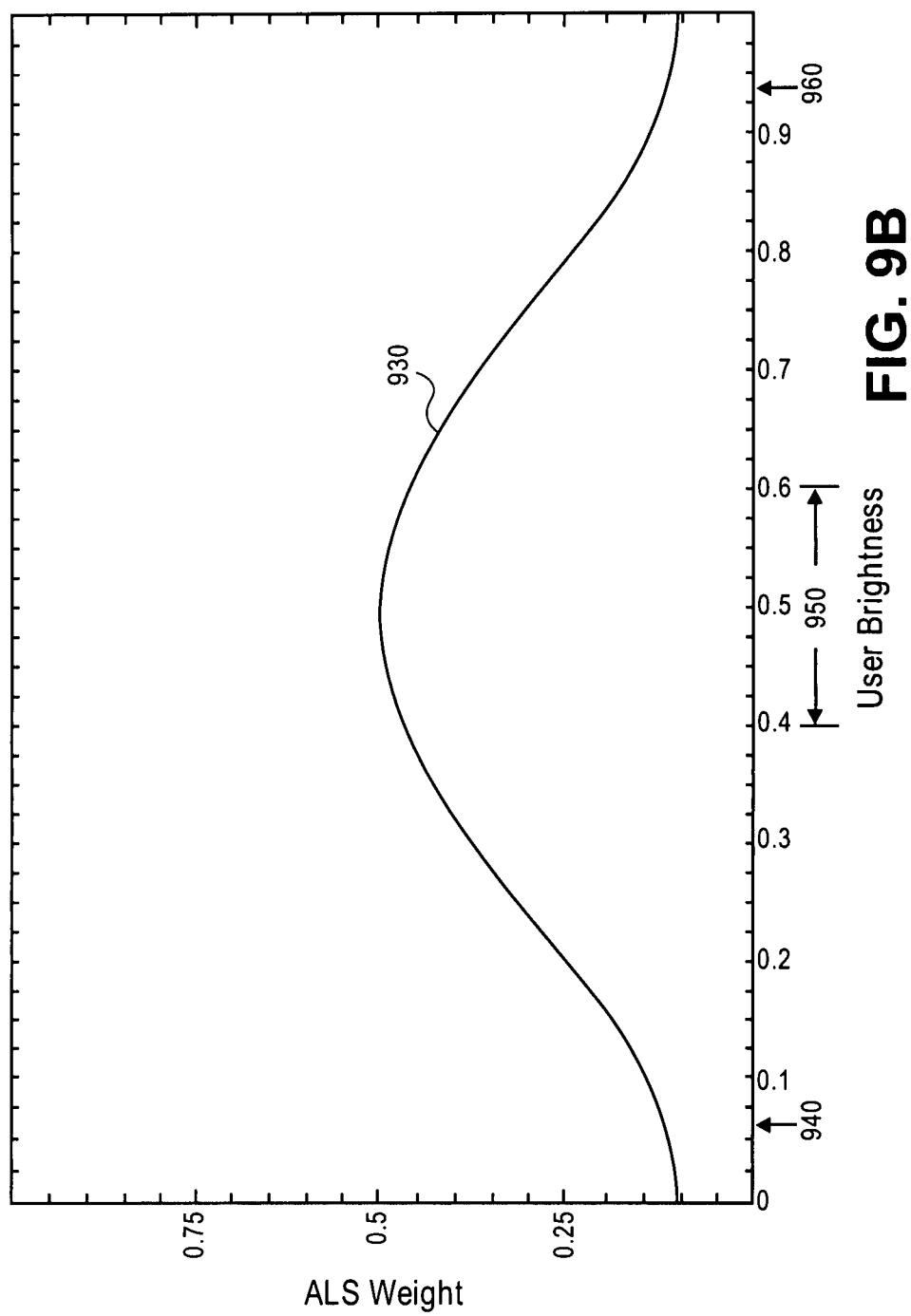
FIG. 9B shows an example of an ALS weight range versus user selected brightness range according to a "bell" shaped curve relationship.

According to some embodiments, the relationship between the ALS weight and the user selected brightness may not be linear, such as for a relationship that has a higher weight between the ends of the user selectable range. For example, FIG. 9B shows an example of an ALS weight range versus user selected brightness range according to a "bell" shaped curve relationship. FIG. 9B shows "bell" shaped curve 930, which may be a Gaussian shaped curve, representing the altering of the ALS weight caused by changes in the user selected brightness level. In FIG. 9B the user selected brightness range includes low end 940, middle portion 950, and high end 960. Also, ALS weight range goes from 10% to 50%, as compared to where the ALS weight range in FIG. 9A, for line 910, only goes to 25%. It can be appreciated that FIG. 9B gradually assigns less weight as the selected brightness moves in either direction away from center 50% brightness or middle portion 950. It can also be appreciated that while curve 930 shows a specific shape, the values selected for the low end, middle portion, and high end may be altered, as long as the middle portion ALS weight is greater than that at the low end and high end. For example, the values at the low end, middle portion, and high end could all be increased or decreased, or increased and decreased with respect to each other. For example, the curve may be simply shifted up or down, or the ends of the curve may be increased or decreased while the middle portion stays the same, and/or the middle portion may be increased or decreased. For example, a less or more pronounced curve may be implanted. In addition, although curve 930 has a peak at the 50% user brightness, it can be appreciated that the curve can be shifted to the left or right with respect to user brightness.

According to embodiments, the backlight brightness of a display depends on, is controlled by, is related to, considers, or is according to the user selected brightness, ALS weight and the ALS value (e.g., a multiple of the weight and value, plus the user selected brightness). The brightness may or may not depend on the user selected brightness times (1-ALS weight), where the weight is normalized.

The physical brightness level resulting from implementing curve 930 may be generalized by normalizing the ALS value (e.g., providing an ALS visible light value in a range between 0 and 1.0, such as described above for implementing equation (a)) as equation (b):

$$\text{brightness} = (\text{ALS value} \times \text{ALS weight}) + (\text{user brightness} \times (1 - \text{ALS weight})) \quad (b)$$

where the ALS weight and user brightness (e.g., user selected brightness) are also normalized (e.g., providing an user brightness value and an ALS weight in a range between 0 and 1.0, based on a received user setting, input or selected brightness level, such as shown in FIG. 9B). The result is the ALS value has less of an affect on brightness as the ALS weight diminishes, at the low end and high end of the user selected brightness, as compared to the middle portion.

FIG. 9C shows examples of device physical brightness level ranges versus ALS output level range for a "bell" shaped curve relationship between ALS weight and user selected brightness. Specifically, for the example, of curve 930, FIG. 9C shows line 970 representing a user selected brightness of 1.0, such as near high end 960 of FIG. 9B. FIG. 9C also shows line 980 representing device brightness for the user selected brightness of 0.5 or half of the maximum. Also, FIG. 9C shows line 990 representing a user selected brightness of 0.1 or 10% of the maximum brightness. It can be appreciated that line 970 has the greatest device brightness as the user has selected the maximum brightness and varies only by 10% corresponding to the 10% ALS weight of FIG. 9B at high end 960. Similarly, line 990 has the lowest device brightness as the user has selected the minimum brightness, and varies by only 10% according to the ALS weight at low end 940 of FIG. 9B. However, for line 980, the device brightness is between line 970 and 990, but has a wide range of 50% change in device brightness with ALS levels as indicated by the ALS weight at the 0.5 user brightness in FIG. 9B. In the case shown in FIGS. 9B and 9C, when the user selects a very dim brightness, the change due to ALS levels is minimal, which may provide the advantage of allowing the user to extend the battery life by selecting a low brightness. Alternatively, for the highest user selected brightness, the change in device brightness effect by the ALS level may also be minimal to provide the user the advantage of being able to keep the backlight bright in order to have the maximum opportunity to view the content on the displayed device. Alternatively, allowing a greater change in the affect or weight of the ALS value on the device brightness between the ends of the user selected brightness, may allow the advantage of providing extended battery by letting the device, processor, or software minimize the brightness of the display backlight to only overcome the ambient light environment.

The use of the term "range" may represent a range of values, weights, or levels described herein. In some cases, the relationship between an ALS weight range and an ALS level range (or value range) may be a proportional, linear, inverse, "bell" shaped curve, and/or Gaussian shaped curved relationship between the weights and values (or levels) (e.g., see FIGS. 9A-9C).

Additional information about proximity sensors can be found in U.S. patent application Ser. No. 11/241,839, titled "PROXIMITY DETECTOR IN HANDHELD DEVICE," and U.S. patent application Ser. No. 11/240,788, titled "PROXIMITY DETECTOR IN HANDHELD DEVICE;" U.S. patent application Ser. No. 11/165,958, titled "METHODS AND APPARATUS FOR REMOTELY DETECTING PRESENCE," filed Jun. 23, 2005; and U.S. Pat. No. 6,583, 676, titled "PROXIMITY/TOUCH DETECTOR AND CALIBRATION CIRCUIT," issued Jun. 24, 2003; and U.S. patent application Ser. No. 11/600,344, filed Nov. 15, 2006 titled "INTEGRATED PROXIMITY SENSOR AND LIGHT SENSOR" which are all incorporated herein by reference in their entireties.

Moreover, according to embodiments, the ALS value or intensity may represent the value or intensity for a plurality of ALS sensors. For example, the device, processor, or software application may receive a number of ambient light sensor output levels from a number of sensors. As noted above, the number of outputs may be weighted depending on or based on the location of each sensor on the device. For example, an ALS sensor on the face of the device pointing at the user may be given a higher weight as it may best represent light falling directly on the display or a cover of the display. Alternatively, sensors facing the ground may be given lower weights, as they face away from light incident upon the display. The multiple sensor outputs are then each multiplied by their weighting factor (e.g., scaled) and added together to represent a total ambient light falling on the entire device. That total ambient light is then normalized to come up with a number from 0 to 1, with 1 representing full sunlight and 0 representing total darkness (e.g., and a lighted room between 1 and 0, with a brightly lit room above a softly or darkly lit room). Thus, it is contemplated that the descriptions herein with respect to an ALS light value apply to the normalized value for multiple ALS sensors, as described herein, such as where the ALS output level or value (e.g., for ambient visible light) is set to an aggregate of the weighted ALS outputs.

Also, according to some embodiments, a display contrast output level (e.g., display control parameters) can be (automatically in some cases) altered according to a change or alteration (automatically or not) of a display brightness output level and/or an ALS output level. For example, the contrast level may be an output level to a display and may be based on the display brightness output level as well as on an ALS output level. Thus, in some cases, a change in either or both of the display brightness level and the ALS output level causes a corresponding or related change in the contrast output level. It can be appreciated that the contrast output level and brightness output level are both output to the same display, such as being components of a backlight of a display. Moreover, in some cases, an increase in the display brightness output level may automatically cause a decrease in the display contrast output level, such as according to a linear or non-linear inverse relationship. Also, an increase in the sensor output level may automatically cause an increase in the display contrast output level, such as according to a linear or non-linear relationship. Thus, if the sensor output level stays the same, and the brightness level increases, the contrast level will decrease. Alternatively, if the brightness level stays the same and the output level increases, the contrast level may increase. It can also be appreciated that if the brightness level increases and the sensor output level increases, to cause an equal alteration or change in the contrast level, the result is no change in the contrast level, as the increase and decrease will counteract each other. Finally, it can be appreciated that descriptions herein with respect to the display brightness output level and ALS output level being received by a device, processor, or software apply to the discussion with respect to the contrast output level embodiment. Similarly, the discussions herein with respect to a machine accessible medium, and instructions executed on a machine or processor apply to the contrast output level embodiment above. Also, the display output level (e.g., change), ALS output level (e.g., change), and/or display contrast output level (e.g., change) may be stored in a memory or storage device. Finally, the concepts herein with respect setting, changing, causing, altering, etc. a display control parameter (e.g., a physical brightness level of a touch input screen), such as based on user inputs (or settings) and ALS levels (values or changes) can be applied to setting, changing, causing, altering, etc. a contrast level (e.g., of a touch input screen), including such as noted above.

FIG. 10 shows another example of a device according to embodiments of the inventions. This device 400 may include a processor, such as microprocessor 402, and a memory 404 (e.g., a storage device), which are coupled to each other through a bus 406. The device 400 may optionally include a cache 408 which is coupled to the microprocessor 402. This device may also optionally include a display controller and display device 410 which is coupled to the other components through the bus 406. One or more input/output controllers 412 are also coupled to the bus 406 to provide an interface for input/output devices 414 (e.g., user interface controls or input devices) and to provide an interface for one or more sensors 416 which are for sensing user activity. The bus 406 may include one or more buses connected to each other through various bridges, controllers, and/or adapters as is well known in the art. The input/output devices 414 may include a keypad or keyboard or a cursor control device such as a touch input panel. In some cases, devices 414 may use or include display device 410, such as where display device 410 is a touch input screen for receiving user inputs and/or settings. Furthermore, the input/output devices 414 may include a network interface which is either for a wired network or a wireless network (e.g. an RF transceiver). The sensors 416 may be any one of the sensors described herein including, for example, a proximity sensor or an ambient light sensor. In at least certain implementations of the device 400, the microprocessor 402 may receive data from one or more sensors 416, input/output devices 414 (e.g., and/or display device 410) and may perform the analysis of and act based on that data in the manner described herein. For example, the data may be analyzed through an artificial intelligence process or in the other ways described herein. As a result of that analysis, the microprocessor 402 may then (automatically in some cases) cause an adjustment of or set one or more settings of the device.

According to some embodiments input/output devices 414 (e.g., and/or display device 410) may include unlock input 424, power-on input 444, and/or wake input 434. Input 424, 444 and/or 434 may be a media selection device, or input device as described herein such as by including, for example, one or more buttons, switches, dials, sliders, keys or keypad, navigation pads, touch pads, touch screens, input portions or zones of touch screens, and the like.

For example, input 424 may be a slide button and switch having two positions, which are "lock" and "unlock". The locked position may cause touch screen inputs such as those described for display/input device 54 of FIG. 4 to be ignored or to not cause any effect or input to a display device such as display 54 or a portable device such as device 50. In the unlocked position input 424 may unlock a display device (e.g., device 414 and/or 410) from a locked state to an unlocked state, the locked state prohibiting the display device from receiving inputs from a touch screen of the display device, and the unlocked state allowing the display device to receive inputs from the touch screen.

Also, wake input 434 may be any of one or more buttons or zones, portions, or points of a multi-point touch input screen or touch screen such as device 54, input/output devices 414 (e.g., and/or display device 410). The wake button may cause a display device such as device 54 and/or a portable device such as device 50 or 400 to come out of a "sleep" or "inactivity dim" state or status. In the wake position input 434 may wake a display device (e.g., device 414 and/or 410), automatically causing a brightness level of the display device to become brighter (and optionally, also causing an unlocked state allowing the display device to receive inputs from the touch screen. In some cases, wake input 434 may be a tap on a touch screen or input screen or a pressing of a button. For instance, "inactivity dim" may refer to a low backlight brightness level that is not sufficient to allow a user to see and identify text, images, and/or video displayed on the display. This low level may be aimed at consuming less power over time than an identifiable brightness so that power will be conserved.

It can be appreciated that the words "dark" and "darker" (e.g., less bright or a lower brightness level) may be interchanged with the words "dim" and "dimmer" in certain situations.

FIG. 10 also shows power-on input 444, which may be a power-on button, "home" button (e.g., to immediately return to the home or main menu), or other input to cause the power to a display device or portable device to be turned on. In some cases, input 444 may also be used to turn the device off. Although inputs 424, 434, and 444 are shown coupled to devices 414, they may be part of devices 414. It can also be appreciated that in the situation where inputs 424, 434, and/or 444 are inputs from a touch screen, they may be part of device 410 or coupled to device 410.

In some embodiments, device 400 may be a device similar to portable device 50 or another device having most (e.g., at least 70%, 75%, 80% or 90%) or all of one of its larger surfaces (e.g., planar surfaces) including or being a touch screen or display/input device such as device 50, device 54, a portable device, an electronic device (e.g., device 100), and/or a display device. For instance, device 400 may have the functionality of a cellular phone, touch screen, media player (e.g., audio such as MP-3, and/or video), portable computer, personal digital assistant, and/or Internet browser.

FIG. 11 is a process for operating a display device. FIG. 11 shows process 1100 such as a process for operating a display device, an electronic device or a portable device (such as device 50, 54, 100, and/or 400); or a device as shown in or described for FIGS. 2, 3, 4, 5A, and 5B. Also, blocks of process 1100 may describe an event, state, status, action, or result that may be stored in a medium or memory and/or may be input to, received by, caused by, or resulting from execution of a machine accessible medium.

At block 1105 the device (e.g., display device or a electronic device) is powered on, such as by detecting or receiving a user input received in response to a user activating a power-on input, such as input 444 and/or a power-on button or "home" button. At block 1105 the device or a display or touch screen or input screen of the device may be locked (e.g., to turn of a touch screen input to avoid erroneous inputs) such that input to the device is not possible until the device is unlocked. Specifically, at block 1105 the device may be in a "on" state as a result of a power on event, and may be in a locked stated or status.

Moreover, at block 1105, the display device (e.g., such as a touch screen input of a portable device) may cause a "power-on" display to be displayed. The power-on display may be an emblem, trademark, or other insignia, image, or text to identify to the user that the device has been powered on, but may remain locked. Moreover, a display control parameter, such as a backlight brightness or brightness level of the display may be equal to or based on a user selected brightness, a predetermined brightness, or a combination of the two. For example, a predetermined default brightness (e.g., for a lock or a wake threshold) may be 50% of the maximum brightness level for the display, which may be modified by a user selected brightness setting.

At decision block 1110, it is determined whether the display device has entered and inactivity dim. Block 1110 may include a timer starting or counting time to determine whether an amount of time has exceeded a predetermined threshold or period of time. If the count of time by the counter exceeds the threshold or period of time, the device may enter inactivity dim. The time out period or period of time described for block 1110 may be more or less than a minute or two, such as by being 30 seconds. When the display device enters an inactivity dim, the display device may be dimmed or caused to become a predetermined brightness. Examples of such predetermined brightness, without limitation thereto, may be equal to or less than 5% or 10% of the maximum brightness of the display while the device is in inactivity dim state. For example, an inactivity time out event may occur which causes the device to enter inactivity dim state or status (e.g., to save power). If the display device enters inactivity dim at block 1110, processing continues to block 1145.

Alternatively, if at block 1110 the device does not enter inactivity dim, processing continues to block 1115 where it is determined whether the display device is unlocked. For example, during the threshold or period of time of block 1110, it may be determined whether or not the device is unlocked at block 1115. If the device is not unlocked, the timer of block 1110 continues to count.

At block 1115, the device may be unlocked by detection or receipt of an unlock input such as input 424 or another input to cause an unlock of the display device, such as resulting from a user activating an unlock input or button. At block 1115, an unlock event may cause the display device (e.g., touch input screen) to go from a locked state or status to an unlocked state or status, such as to allow the display device to receive input or to be used as a touch screen or touch input to provide input to the display device or a portable device. Block 1115 may include receiving a user input (e.g., user activation) of a display control parameter, such as of display control parameter unlock input 424. That input may cause an effect of ALS value on control of another display control parameter, such as on control of a backlight brightness or brightness display control parameter of the display device. For example, that input may cause blocks 1120, 1125, and/or 1128 to occur or be performed.

If at block 1115 the device is not unlocked (e.g., is unlocked), processing returns to block 1110.

If at block 1115 the device is unlocked, processing continues to block 1120. At block 1120, it is determined whether an environment that the display device is exposed to or in (e.g., is incident upon the device) is brighter or darker than a lock threshold. Block 1120 may include receiving and/or comparing one or more ALS outputs or readings to one or more predetermined thresholds or predetermined threshold ranges.

For example, block 1120 (or block 1115) may include an ALS taking readings and providing output of ambient light measurements, levels and/or changes. Those levels or changes may be received, and compared to one or more lock thresholds.

It can be appreciated the description above for multiple ALSs applies here as well (and optionally for blocks 1130 and/or 1150). For example, at block 1120 (and optionally for blocks 1130 and/or 1150) the output of multiple sensors can be summed together and unified to be compared to one or more thresholds.

For example, at block 1120, the lock threshold may be a single number or level, or may be a range of numbers or levels. The lock threshold may be a number or range based on a predetermined default brightness (e.g., 50% of the maximum brightness level for the display), which may be modified by a user selected brightness setting (e.g., an increase or decrease by 0-50 percent to provide a range from 0% of the maximum brightness to 100% of the maximum brightness).

Thus, at block 1120 the environment may be brighter than the threshold, darker than the threshold, or neither (e.g., in the case the environment is at or within the lock threshold). If at block 1120 the environment is within the lock threshold, processing continues to block 1130. Alternatively, if at block 1120 the environment is brighter than the lock threshold, processing continues to block 1125. Moreover, if at block 1120 the environment is darker than the lock threshold, processing continues to block 1128.

Examples of the lock threshold, without limitation thereto, may include a 50% of the maximum display device brightness threshold, where a range centered around 50%, such as a range between 40 and 60%. Moreover, block 1115 may include a gradual or smooth transition of the brightness from the brightness described at block 1105 to the brightness described at block 1125, 1120 (e.g., in the instance that the environment is at or within the lock threshold), or block 1128. For example, the transition may occur over a period of time less than a second, such as a period of 0.25 seconds, such as to appear smooth. Moreover, during this transition, the display may display various images, video, animation, etc. to provide information to and/or cause the transition of brightness to be less noticeable by the user. At the end of this transition period, a "home" screen may be displayed on the display device.

According to some embodiments, block 1120 may include receiving and/or considering one or more ALS readings (e.g., levels) or outputs over a period of time, such as by comparing those readings or an average of those readings to the threshold. If the averages of the readings or all of the readings are greater than or less than the threshold, then the environment may be considered brighter or darker.

At block 1125, the display device is caused to become brighter. For example, block 1125 may include increasing the backlight brightness or brightness level of a display device, touch screen, or touch input device. Block 1125 may also describe increasing a screen brightness to cause a screen to become brighter, or causing a result of the input at block 1115 on an effect of an ALS value on control of the display control parameter of the display brightness. Block 1125 may include that if the ALS value at block 1120 is greater than a lock threshold, automatically causing, based on the ALS value, an increase in the display control parameter. The increase may be to a physical brightness level sufficient to allow a user to see and identify text, images, and/or video displayed on the display in the current ambient light environment.

At block 1128, the display device is caused to become dimmer. For example, block 1128 may include decreasing the backlight brightness or brightness level of a display device, touch screen, or touch input device. Block 1128 may also describe decreasing a screen brightness to cause a screen to become dimmer, or causing a result of the input at block 1115 on an effect of an ALS value on control of the display control parameter of the display brightness. Block 1125 may include that if the ALS value at block 1120 is less than the lock threshold, automatically causing, based on the ALS value, a decrease in the display control parameter. The decrease may be to a physical brightness level sufficient to allow a user to see and identify text, images, and/or video displayed on the display in the current ambient light environment.

Causing the display device to become brighter at block 1128 may be a smooth transition over time, such as described above for block 1125.

After blocks 1125 or 1128, processing to block 1130. At block 1130 it is determined if the environment has transitioned over a brighter or darker transition threshold. Block 1130 may include determining whether an environment or setting that the display device or portable device is exposed to or that is incident upon the device has an ambient light brightness change that exceeds the transition threshold. For example, block 1130 may include receiving an ALS value change that exceeds a predetermined threshold for a predetermined period of time. Similar to the discussion above for block 1120, block 1130 may include receiving a number of ALS readings or outputs over time and comparing those readings or outputs to one or more predetermined threshold values. In some cases, each value may be compared to the threshold, such as to ensure that each value exceeds the threshold for a period of time. Alternatively, an average of the values over the period of time may be compared to the threshold. Block 1130 may include considering outputs from one or more ALSs, such as described above for block 1120.

A period of time considered for determining whether a transition has occurred at block 1130 may be between 1 and 10 seconds, such as by being a period of 5 seconds. In some cases, during this period of time, the ALS readings or environment must continue to be beyond a brighter or darker transition threshold for the transition to brighter or darker to occur. Thus, if any value or reading does not exceed one or the other of those thresholds, processing will continue to block 1140.

At block 1135 the display device is caused to become brighter. Block 1135 may include the descriptions above with respect to block 1125. Moreover, block 1135 may include causing a change that is greater than or based on a transition in block 1130 greater than the transition threshold. Thus, block 1135 may include at least a certain increase in brightness based on or proportional to the transition threshold. Causing the display device to become brighter at block 1135 may be a smooth transition over time, such as described above for block 1125. Moreover, the increase in brightness may include that the transition is greater than the transition threshold. For example, block 1135 may include increasing the brightness by an amount proportional to the transition threshold as well as an additional increase proportional to the amount that the environment has transitioned over the threshold. The increase may be to a physical brightness level sufficient to allow a user to see and identify text, images, and/or video displayed on the display in the current ambient light environment.

For example, if prior to block 1130, the environment was at a 50% environment maximum brightness, and transitions to a 95% of maximum environment brightness, at block 1135 the display device would be caused to become brighter by the difference of 45% of maximum environment brightness (presuming the display is capable of such a level), even though the transition threshold may only be 25%. Alternatively, if the new environment is at only 60% of the maximum environment brightness, at block 1130 the processing would not exceed a 25% transition threshold and would continue to block 1140. Block 1135 may include that if the change at block 1130 is an increase, altering, based on the ALS value change, an effect of the ALS value change on control of the display control parameter of display brightness, such as by causing a screen or display brightness of a display device, touch screen or input screen to become brighter.

If at block 1130 the environment has transitioned over a darker threshold, processing continues to block 1138. The darker transition threshold may be the same threshold in magnitude as that described for transitioning to block 1135, but may be with respect to the environment becoming darker or dimmer. In some cases, there may be not darker threshold (and there may be no change in display brightness). According to embodiments, at block 1138, the display device brightness is not changed (e.g., is not caused or altered based on an ALS value or change), but stays at the same brightness it was at for block 1130. Block 1138 may include not altering, based on an ALS value change, an effect of the ALS value change on control of a display parameter, such as a brightness level of a display, touch screen, or touch input. One of the benefits of block 1138, without limitation thereto, may be that it is easier for a user to read, use, and/or provide input to a screen that does not or is not transitioning from brighter to darker, even though the environment may become darker. Specifically, at block 1138 the physical brightness level (e.g, when not changed) may be sufficient to allow a user to see and identify text, images, and/or video displayed on the display in the current ambient light environment.

In addition, another benefit may be that not changing the brightness at block 1138 reduces a cycle of decreasing and then increasing brightness when the environment is cycling from darker to brighter, darker to brighter, etc., such as to reduce eye strain or make using and viewing the display device more comfortable to a user.

At block 1140 it is determined whether the display device has entered inactivity dim. Block 1140 may include descriptions above for block 1110 (e.g., enter dim after a period of time, such as 30 seconds), with the exception that the display device may not be in the locked state and/or showing an initial screen, but may be displaying video, images, texts, etc. as described herein in an unlocked state. Thus, at block 1140, if the display is not entering an inactivity state, processing may return to block 1130 to determine whether the brightness of the display device need be adjusted such as described for block 1135 or 1138. Thus, in some embodiments, processing of blocks 1130, 1135, 1138, and 1140 may be according to descriptions herein as described above for FIGS. 1-10 and/or as described below, such as where ALS weight, user brightness, ALS level, and device brightness are described as noted in FIGS. 9A-9C. If at block 1140 the display enters inactivity dim, processing continues to block 1145.

At block 1145 it is determined whether the display device has been woken or awakened. Block 1145 may include waking the display device from an inactive dim state (e.g., see block 1110), such as by receiving a user input of display control parameter wake input 434. Input 434 may be activated by a user to wake the display from inactivity dim state. That input may cause an effect of ALS value on control of another display control parameter, such as on control of a backlight brightness or brightness display control parameter of the display device. For example, that input may cause blocks 1150, 1155, and/or 1158 to occur or be performed.

If at block 1145 the screen is not woken, processing continues to block 1160. At block 1160 it is determined whether the display enters lock. Block 1160 may include receiving a user input, such as described above for block 1115, but to cause the screen to become locked. For example, a slide button or input 424 may also be used to lock the screen at block 1160. It can be appreciated that such locking of the screen, by the user, may occur at any point after block 1115 in process 1100.

Alternatively, block 1160 may include the counter of block 1145, or a new counter counting to a threshold or a period of time without user input to an input device or to the display device. For example, a second threshold or period of time after which the device enters inactivity dim at block 1110 or 1140 may be predetermined. After the counter reaches or times out at this second period of time, the display device may enter lock.

The period of time to enter lock at block 1160 may be a greater than, less than, or equal amount of time (and in addition to) to that to enter inactivity dim at block 1110 (or 1140). Thus if the device enters inactivity dim after 30 seconds, and the lock time is equal to the dim time, the device will enter lock 30 seconds after entering dim. It can be appreciated that other periods of time and non-equal periods for dim and lock are contemplated.

Upon entering lock, the display device may act as described above for block 1105. In addition, the display may turn off, display zero brightness, or display a minimum brightness of the total brightness range. After block 1160, processing continues to block 1170 where it is determined if the display device is unlocked or becomes unlocked. Block 1170 may include descriptions above for block 1115. If at block 1170 the display device is unlocked, processing returns to block 1120.

Alternatively, if at block 1145 the display device is woken or awaking, processing continues to block 1150. At block 1150, it is determined if the environment is brighter or darker than a wake threshold. Block 1150 may include determining whether an environment or setting that the display device or portable device is exposed to or that is incident upon the device has an ambient light brightness change that exceeds the wake threshold. For example, block 1150 may include receiving an ALS value that exceeds a threshold based on a predetermined wake threshold (which may be the same as for the lock threshold) and a user setting, for a predetermined period of time. Similar to the discussion above for block 1120, block 1150 may include receiving a number of ALS readings or outputs over time and comparing those readings or outputs to one or more predetermined threshold values. In some cases, each value may be compared to the threshold, such as to ensure that each value exceeds the threshold for a period of time. Alternatively, an average of the values over the period of time may be compared to the threshold. Block 1150 may include considering outputs from one or more ALSs, such as described above for block 1120.

The wake threshold may be a threshold such as described above for the lock threshold or transition threshold. Thus, a wake threshold may be a single number or level, may be a range of numbers of levels, or may be a minimum transition or change in environment brightness. Similarly, a wake threshold may be a number or range based on a predetermined default brightness (e.g., 50% of the maximum brightness level for the display), which may be modified by a user selected brightness setting.

Block 1130, 1140, and/or 1150 may include numerous ALS readings, outputs, or values, such as where the transition is a change over a period of time from a first value to a second value. In such cases, causing the display to become brighter, or altering an effect of the ALS change on control of the display control parameters may be based on the second ALS value and alter the effect of the second value on control of the display control parameter.

If at block 1150 the environment is brighter than the wake threshold, processing continues to block 1155. Alternatively, if at block 1150 the environment is not brighter or darker than the wake threshold, processing continues to block 1158. Also, if at block 1150 the environment is darker than the wake threshold, processing continues to block 1158.

At block 1155, the display device is caused to "snap" brighter or become immediately brighter. Causing the device to snap brighter at block 1155, may include descriptions above at block 1125 for causing a screen to become brighter, with the exception of the "snap" as described below. The terms "snap" and "immediately" to describe block 1155 indicate that the transition to become brighter happens immediately or nearly immediately as opposed to making a smooth transition as described above for blocks 1125, 1128, and 1135. Moreover, block 1155 may described causing a brightness level of a display device to become brighter based on, or caused by, an effect of one or more ALS values on control of a display control parameter brightness of the display device. The increase may be to a physical brightness level sufficient to allow a user to see and identify text, images, and/or video displayed on the display in the current ambient light environment. For example, receiving a user input to wake the device at block 1145 may immediately cause, as a result of that input, an effect of one or more ALS values on control of the brightness level of the display device by causing it to become brighter by an amount based on the one or more ALS values.

Alternatively, if at block 1150 the environment becomes darker than the wake threshold, at block 1158 the display is caused to snap or immediately become a "little" brighter. Causing the device to snap brighter at block 1158, may include descriptions above at block 1155 (and/or 1125) for causing a screen to snap brighter, with the exception of the term "little". The term "little" indicates that the brightness may not be based on or proportional to the brightness of the environment. For example, a little brighter may indicate that the screen snaps from the inactivity dim to a brightness level just above the inactivity dim, such as, without limitation thereto, a level that is 1%, 2%, or 5% greater than the inactivity dim brightness level. Snapping a little brighter may include increasing the physical brightness level to a level sufficient to allow a user to notice the display backlight or a change in the display backlight. For example a user may notice or identify a change in backlight brightness, text, images, and/or video displayed on the display. Thus, upon receiving a user input, such as to wake the device at block 1145, an effect may be cause of one or more ALS values on control of the display control parameter of brightness to immediately cause the display to be a little a brighter.

According to some embodiments, determining whether the environment is brighter than a wake threshold may include considering a brightness wake threshold similar to the description at block 1130 for a brighter transition threshold. For example, such a bright wake threshold may require a minimum level of change above the inactivity dim level. In this case, the display may be caused to snap a little brighter. Alternatively, the bright wake threshold may be a threshold described for the lock threshold of 1120 but at the inactivity dim brightness level, such as 5% of the maximum brightness of the display level. Thus, at block 1155, as long as the environment is brighter than the wake threshold, the device will be caused to snap brighter by at least a minimum or, little brighter amount. In this case, the little brighter level or amount of block 1158 will be less than or equal to the level or amount of brightness increase at block 1155.

In addition, according to embodiments, if at block 1150 the environment is not darker than the wake threshold and is not brighter than the wake threshold, processing continues to block 1158. Thus, a benefit of causing the device to snap a little brighter, without limitation thereto, may be that upon waking the device at block 1145, the screen becomes brighter by an amount sufficient to be noticed by the user and/or indicates to the user that the device is awake. Alternatively, if the device were allowed to become darker due to the darker environment, the user may not notice that the device is awake and may inadvertently make erroneous inputs (e.g., by touching or holding the device by the touch input) or allow erroneous inputs (e.g., by putting the device in a pocket or case, or otherwise exposing the touch input to contact) to the display. Specifically, it can be appreciated that in a dark environment, a user may tap the screen to wake the device and, not noticing that the device is awake, continue to tap the screen thus causing numerous inputs that could cause erroneous actions by the device.

After blocks 1155 and 1158 processing returns to block 1130.

It can be appreciated that a power off input, such as using power-on input 444 to power off the display device or portable device may be received or caused by a user at any point during process 1100 (e.g., see description of block 1160 for entering lock). Moreover, it is considered that each action (e.g., causing or altering), event, state, or status of each block of process 1100 may occur automatically (e.g., automatically causing a brightness level of the display device to become one of brighter and dimmer) with the exception of block 1105, 1115, and 1170. Also, according to embodiments, each action, event, state, or status of each block of process 1100 may include displaying a physical brightness level of a backlight of a portable device according to the a display control parameter (e.g., automatically causing a brightness level of the display device to become one of brighter and dimmer) with the exception of block 1105, 1115, and 1170.

Moreover, according to embodiments, various blocks or sets of blocks may be removed from or occur independently of process 1100. For example, some embodiments may include blocks 1115, 1120, 1125, and 1128, but no others. Independently of (or in addition to, in some examples) those blocks, some embodiments may include blocks 1130, 1135, and 1138, but no others. Next, independent of the blocks of either or both of the embodiments described immediately above (or in addition to, in some examples), some embodiments may include blocks 1145, 1150, 1155 and 1158, but no others.

Input 1124, 1134, and/or 1144 may be described as user inputs of a display control parameter, where the display control parameter is unlock (and/or lock), wake, and/or power on (and/or power off). In some cases, any of these embodiments may be effected additionally by another user input or setting (e.g., in addition to unlock or wake). For example, a user setting of a physical brightness level of a backlight of the display device may be received. The lock or wake threshold may be based on a predetermined value (e.g., default brightness, say 50%) and this user setting. Then, the display control parameter (e.g., backlight brightness level) may be based on the predetermined value, the user setting, and the ALS value. The backlight brightness level may be for a portable device, and the level may be capable of being a value within a range of values (e.g., 0% to 100% maximum display brightness).

According to embodiments, the increase or decrease in the display control parameter may be proportional to, relative to, dependent on, or match the ALS value. Also, the ALS value is based on an amount of ambient light in the environment incident upon the display device; and/or the display control parameter may be a physical brightness level of the display device that is sufficient to allow a user to see and identify text, images, and/or video displayed on the display.

According to embodiments, the concepts above (e.g., see FIGS. 9-11, without limitation thereto) for receiving a user input or setting (or changes thereof) of a display control parameter, and causing or altering (or causing not to be altered), (automatically in some cases) based on the user input or setting, an effect of an ALS on control of the display control parameter apply to portable and non-portable devices. Such portable devices include devices having the functionality of a cellular phone, touch screen, media player (e.g., audio such as MP-3, and/or video), portable computer, personal digital assistant, and/or Internet browser. Thus, in some case, a parameter of a backlight for a portable device (such as a cell phone with a media player, MP-3 player, touch screen, and/or lap-top computer) may be altered depending on an ambient light environment (e.g., an amount of light in a certain setting) that the device is currently in; that the device is moved into (e.g., moving from indoor to outdoor light, and vice versa); and/or that changes at the device (e.g., by turning on, turning off, or adjusting (such as using a dimmer switch) a level of indoor lighting; or outdoor light (e.g., by opening or closing curtains, blinds, doors, etc.). Alternatively, in some cases, a parameter of a backlight for a non-portable device (such as a desktop computer) may be altered depending on an ambient light environment that the device is currently in or that changes at the device in the room the device is in).

Total ambient light may be normalized to come up with a number from 0 to 1, with 1 representing full sunlight and 0 representing total darkness (e.g., and a lighted room between 1 and 0, with a brightly lit room above a softly or darkly lit room). Other examples may be an office with some sun coming through the window (e.g., blinds blocking half the area of the window) may be the number 0.5; bright sun may be the number 0.95; a dark room with 1 dim light, a TV, or night light may be the number 0.05.

According to some embodiments, the ALS output value received from one or more sensors may be used to operate a proximity sensor of an electronic device by (automatically in some cases) setting, causing, altering or changing an on/off setting (e.g., setting, event, level, state, and/or status) of a proximity sensor. The setting or changing may be to set or alter a setting of a proximity sensor to power up, turn on, power down, turn off, such according to an output level or change in level of an ALS. In some cases, when a change to a light sensor output level (e.g., a change in ambient light level) that exceeds a threshold limit, the proximity sensor powers up, turns on, powers down, or turns off. The change in the output level can be a rate of change of an ambient light level and an amount of change of an ambient light level that exceeds a threshold. For example, the change may be a rapid (e.g., over a short period of time) or drastic (e.g., over a wide range of levels) change in the visible light or IR light as determined by one or more ALS sensors, as described herein. For multiple sensors, the sensor outputs may be multiplied or weighted as described herein. Moreover, the ALS sensor output may be compared to a rate of change or amount of change threshold to cause the proximity sensor to power up.

Thus, the ALS sensor output may be received by an electronic device, processor, or software application as described herein which causes powering up or turning on of the proximity sensor in response to the ALS level exceeding the threshold. It can be appreciated that this process allows for conservation or reduction of use of power or battery energy consumed by the proximity sensor (e.g., such as by the IR emitter, sensor, and processing logic).

Also, in some cases, the ALS sensor output may be used in connection with other sensor outputs, such as accelerometer output, a "lock" button (e.g., to hold a setting of a device), and "on" button to turn on an electronic device. The concepts described above with respect to turning on a proximity sensor apply here as well, such as to conserver or reduce power or battery consumption by only turning on the device if, in addition to another sensor output, a threshold is exceeded by the ALS sensor output. It can be appreciated that this reduces occurrences or possibilities of an inadvertent "bump", "lock" button, "on" button pressure from turning on the device and consuming battery power when not intended by the user.

According to embodiments (e.g., see FIGS. 9-11, without limitation thereto), a "user input" or "user setting" may be a brightness or contrast level, setting, or selection received (e.g., requested) from the user by a device, processor, or software application. In some cases, a "user input" or "user setting" may be a power-on/off, lock/unlock, wake/inactive dim level, setting, or selection received from the user by a device, processor, or software application. As such, the user input or setting may describe data relating to touches received by a touch input panel, button, or slide; data received from an input device; and/or data received from a user interface of an electronic device or touch screen thereof. In some cases the user setting may be a user selected brightness level, such as to select a brightness level in a range of user brightness level settings.

Also, according to embodiments, the output of the light sensor may be a value or level of ambient light (e.g., visible ambient light) sent by the sensor and received by a device, processor, or software application. For example, the light sensor "value" may be an ALS level, or output, such as a reading, electrical signal level or amplitude output by an ALS based on a level or intensity of ambient light received by or incident upon the ALS.

Next, "control" of a display control parameter may describe setting, changing, effecting, determining, causing, altering, causing not to be altered, or adjusting the parameter or level of the parameter.

Moreover, use of the term "weight", "weighted" or "weighting" herein may describe using a weight value or scalar stored in a memory, logic, processing logic, register, or software to multiply, increase, or decrease the amplitude or intensity of a signal or value (e.g., such as a detected or sensed intensity or amplitude). The weighted value may be described as a value that is scaled, multiplied, driven, increased, amplified, or attenuated by the weight. In some cases, weighting may describe using software to apply a "gain" to an output of a sensor or photodiode.

Also, the term "automatically" may describe a cause and effect relationship, such as where something is caused, altered, caused not to be altered, changed, or set without receiving a user input or action directed at the altered or changed result. For example, a setting, input, received value (or change thereof), or selection received from a user that causes a first effect (e.g., for one display control parameter or user setting, other than a brightness level, such as a lock/unlock or wake input), may also cause an additional change or effect in a second display control parameter or level (e.g., automatically cause or alter a brightness level). In some cases, "automatically" may describe a result that is a secondary result or in addition to a primary result according to a received user input, setting or selection.

According to some embodiments, the concepts described above (e.g., for FIGS. 9-11) may be implemented using a machine accessible medium containing instructions (e.g., such as storage device 104, memory 404, or executable program/software instructions stored thereon) that, when executed, cause a machine or processor (e.g., such as digital processing system 103, microprocessor 153, or processor 402) to perform (e.g., automatically or not) one or more actions. The actions may include the receiving, causing, altering, controlling, generating, displaying, relating, processing, processes, and/or other actions, described herein, such as to operate a data processing system, portable device, electronic device, display, display control parameter, backlight control parameter, backlight brightness, or backlight contrast as described herein.

Also, a user setting, selection, selected brightness level or input may describe a change in the setting, selection, level or input, such as one that (automatically in some cases) causes or alters an ALS output effect, weight, display control parameter, or display brightness level according to that change. In this case, setting the weight may or may not include changing a current setting of the weight of the ALS output value. In some cases, such user selection may be a user input to control a user interface feature value, and a weight of an ALS output value that the user interface feature level is based on may be automatically set or adjusted as a result of, depending on, or due to the user input.

Finally, it can be appreciated that the user setting (or change thereof), user input (or change thereof), threshold (e.g., predetermined threshold), level (e.g., predetermined level), amount (e.g., predetermined amount), display control parameter, light sensor value, light sensor output level (e.g., value), user selected brightness level, display brightness level, ALS output weight, ALS output level, ALS level change, device setting and/or system requested level described herein may be stored in a machine accessible medium, such as a memory or data storage device (e.g., device 104, memory 404, system 103, processor 153, processor 402, and the like). In some cases, the stored values, selections, or levels, etc. noted above may be accessed by a device or processor to determine or calculate a display control parameter or brightness level (e.g., displayed by a backlight of a display).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of operating a display device of an electronic device, the method comprising:
   powering on the electronic device and the display device;
   as a result of powering on, displaying a first brightness level of the display device as one of a user selected brightness, or a predetermined brightness, wherein a plurality of different ambient light levels do not affect control of the brightness level of the display device after powering on, and prior to wake of the display device from an inactivity dim state;
   operating the display device in an on state in the inactivity dim state prior waking of the display device;
   receiving a user input requesting a wake of the display device from the inactivity dim, wherein the user input requesting a wake is a tap on a touch screen;
   as a result of the user input, waking the display device, wherein determining comprises:
   determining, as a result of the user input, whether an ambient light sensor (ALS) value affects control of a brightness level of the display device;
   if the ALS value is greater than a wake threshold, automatically causing, based on the ALS value, a first increase in the brightness level of the display device, wherein automatically causing occurs throughout a first range of the brightness level; and
   if the ALS value is less than the wake threshold, automatically causing, not based on the ALS value, a predetermined second increase in the brightness level of the display device, wherein automatically causing occurs throughout a second range of the brightness level, wherein the second increase is less than the first increase.

2. The method of claim 1, further comprising receiving a further user input at the touch screen input to unlock a touch screen input capability and unlocking the touch screen input capability in response to the further user input.

3. The method of claim 1 wherein the input wakes the display device, and wherein the effect includes automatically causing a brightness level of the display device to become brighter.

4. The method of claim 3 further comprising displaying a physical brightness level of a backlight of a portable device according to the brightness level of the display device.

5. The method of claim 1 further comprising:
   if the ALS value is greater than the wake threshold, automatically causing, based on the value change, a brightness level of the display device to snap brighter by the first increase, wherein automatically causing occurs throughout the total range of the brightness level; and
   if the ALS value is less than the wake threshold, automatically causing, based on the value change, the brightness level of the display device to snap a little brighter by the second increase, wherein automatically causing occurs throughout the total range of the brightness level.

6. The method of claim 5, wherein the ALS value is based on an amount of ambient light in the environment incident upon the display device; and wherein a physical brightness level is sufficient to allow a user to see and identify text, images, and/or video displayed on the display device.

7. The method of claim 1 further comprising:
   receiving a user setting of a physical brightness level of a backlight of the display device; wherein the wake threshold is based on a predetermined value and the user setting; and wherein the brightness level of the display device is based on the predetermined value, the user setting, and the ALS value.

8. The method of claim 7, wherein the user setting comprises a backlight brightness level of a portable device, and the level is capable of being a value within a range of values.

9. The method of claim 1, wherein the first increase in the brightness level of the display device matches the ALS value throughout the total range of the brightness level, and the second increase in the brightness level of the display device is sufficient to allow a user to notice a change in backlight brightness of the display device.

10. The method of claim 1, wherein the inactivity dim is equal to or less than 5 or 10 percent of the maximum display device brightness, and wherein the affect includes a smooth transition of a brightness level of the display device from an inactivity dim brightness level to another brightness.

11. The method of claim 1, further comprising:
    after powering on but prior to waking, entering the inactivity dim state.

12. A non-transitory tangible machine readable medium containing executable program instructions which when executed cause a method of operating a display device of a data processing system, the method comprising:
    powering on the electronic device and the display device;
    as a result of powering on, displaying a first brightness level of the display device as one of a user selected brightness, or a predetermined brightness, wherein a plurality of different ambient light levels do not affect control of the brightness level of the display device after powering on, and prior to wake of the display device from an inactivity dim state;
    operating the display device in an on state in the inactivity dim state prior to waking of the display device;
    receiving a user input requesting a wake of the display device from the inactivity dim, wherein the user input requesting a wake is a tap on a touch screen;
    as a result of the user input, waking the display device;
    determining, as a result of the user input, whether an ambient light sensor (ALS) value affects control of a brightness level of the display device, wherein determining comprises:
    if the ALS value is greater than a wake threshold, automatically causing, based on the ALS value, a first increase in the brightness level of the display device, wherein automatically causing occurs throughout a first range of the brightness level; and
    if the ALS value is less than the wake threshold, automatically causing, not based on the ALS value, a predetermined second increase in the brightness level of the display device, wherein automatically causing occurs throughout a second range of the brightness level,
    wherein the second increase is less than the first increase.

13. The medium of claim 12 wherein the input wakes the display device, and wherein the effect includes automatically causing a brightness level of the display device to become brighter.

14. The medium of claim 12 the method further comprising:
    if the ALS value is greater than the wake threshold, automatically causing, based on the value change, a brightness level of the display device to snap brighter by the first increase, wherein automatically causing occurs throughout the total range of the brightness level; and if the ALS value is less than the wake threshold, automatically causing, based on the value change, the brightness level of the display device to snap a little brighter by the second increase, wherein automatically causing occurs throughout the total range of the brightness level.

15. The medium of claim 12 the method further comprising:

receiving a user setting of a physical brightness level of a backlight of the display device; wherein the wake threshold is based on a predetermined value and the user setting; and wherein the brightness level of the display device is based on the predetermined value, the user setting, and the ALS value.

16. The medium of claim 12, further comprising receiving a further user input at the touch screen input to unlock a touch screen input capability and unlocking the touch screen input capability in response to the further user input.

17. The medium of claim 12, wherein the inactivity dim is equal to or less than 5 or 10 percent of the maximum display device brightness, and wherein the affect includes a smooth transition of a brightness level of the display device from an inactivity dim brightness level to another brightness.

18. The medium of claim 12, further comprising:

after powering on but prior to waking, entering the inactivity dim state.

* * * * *